United States Patent

Deter et al.

[11] Patent Number: 6,137,461
[45] Date of Patent: Oct. 24, 2000

[54] METHOD AND DEVICE FOR DISPLAYING A VIDEO IMAGE AND METHOD FOR THE PRODUCTION OF SAID DEVICE

[75] Inventors: Christhard Deter; Klaus Hiller, both of Gera; Wolfgang Vogel, Jena; Holger Frost, Gera, all of Germany

[73] Assignee: LDT GmbH & Co. Laser-Display-Technologie KG, Gera, Germany

[21] Appl. No.: 09/142,716

[22] PCT Filed: Feb. 3, 1998

[86] PCT No.: PCT/EP98/00564

§ 371 Date: Sep. 14, 1998

§ 102(e) Date: Sep. 14, 1998

[87] PCT Pub. No.: WO98/59500

PCT Pub. Date: Dec. 30, 1998

[30] Foreign Application Priority Data

Jun. 24, 1997 [DE] Germany .......................... 197 26 860

[51] Int. Cl.[7] .................................................. G09G 3/34
[52] U.S. Cl. .............................. 345/84; 345/85; 359/215; 359/216
[58] Field of Search .................................. 345/32, 84, 85, 345/86; 348/711; 359/216, 217, 215

[56] References Cited

U.S. PATENT DOCUMENTS

| | | | |
|---|---|---|---|
| 4,796,961 | 1/1989 | Yamada et al. | 350/6.8 |
| 5,281,960 | 1/1994 | Dwyer, III | 345/31 |
| 5,534,950 | 7/1996 | Hargis et al. | 348/758 |
| 5,614,961 | 3/1997 | Gibeau et al. | 348/750 |
| 5,892,556 | 4/1999 | Deter | 348/739 |
| 5,903,304 | 5/1999 | Deter | 348/57 |

FOREIGN PATENT DOCUMENTS

| | | |
|---|---|---|
| 2 460 081 | 1/1981 | France . |
| 41 39 842 | 8/1992 | Germany . |
| WO 94/18802 | 8/1994 | WIPO . |
| WO 95/03676 | 2/1995 | WIPO . |
| WO 95/10159 | 4/1995 | WIPO . |

OTHER PUBLICATIONS

Patent Abstract of Japan, vol. 9, No. 156 (P–368) Jun. 29, 1985 / JP Publication No. 60 032019 Feb. 19, 1985 (Yoshiaki Matsunaga).

*Primary Examiner*—Vijay Shankar
*Assistant Examiner*—Mansour M. Said
*Attorney, Agent, or Firm*—Reed Smith Shaw & McClay LLP

[57] ABSTRACT

In a device for displaying a video image with a source emitting at least an intensity-modulated light bundle (41, 42) and a deflecting device (41, 42) for deflecting the light bundle, for the angle-proportional scanning of $N_p$ image points in lines over an angle $\alpha_p$, and for the angle-proportional scanning of the light bundle of $N_z$, lines of the video image over an angle $\alpha_z$, the source emits two light bundles which can be modulated independently from one another, the first light bundle being modulated with the video information for the illumination of a first image point controlled by raster scanning and the second light bundle being modulated with the video information for the illumination of a second image point, wherein the video information of the second image point is offset relative to the video information of the first image point by $m_z$ lines of an image and $m_p$ image points of a line, with whole numbers $m_z \leq N_z$ and $m_p \leq N_p$, and $m_z$ and/or $m_p \neq 0$, and an optical system is provided which combines the two light bundles at a common real or virtual point (54) situated in front of or inside the deflecting devices in the direction of light propagation, the two light bundles traveling apart proceeding from this real or virtual point (54) at a predetermined angle $m_z \times \alpha_z / N_z$ in the image scanning direction and at a predetermined angle $m_p \times \alpha_p / N_p$ in the line scanning direction.

17 Claims, 10 Drawing Sheets

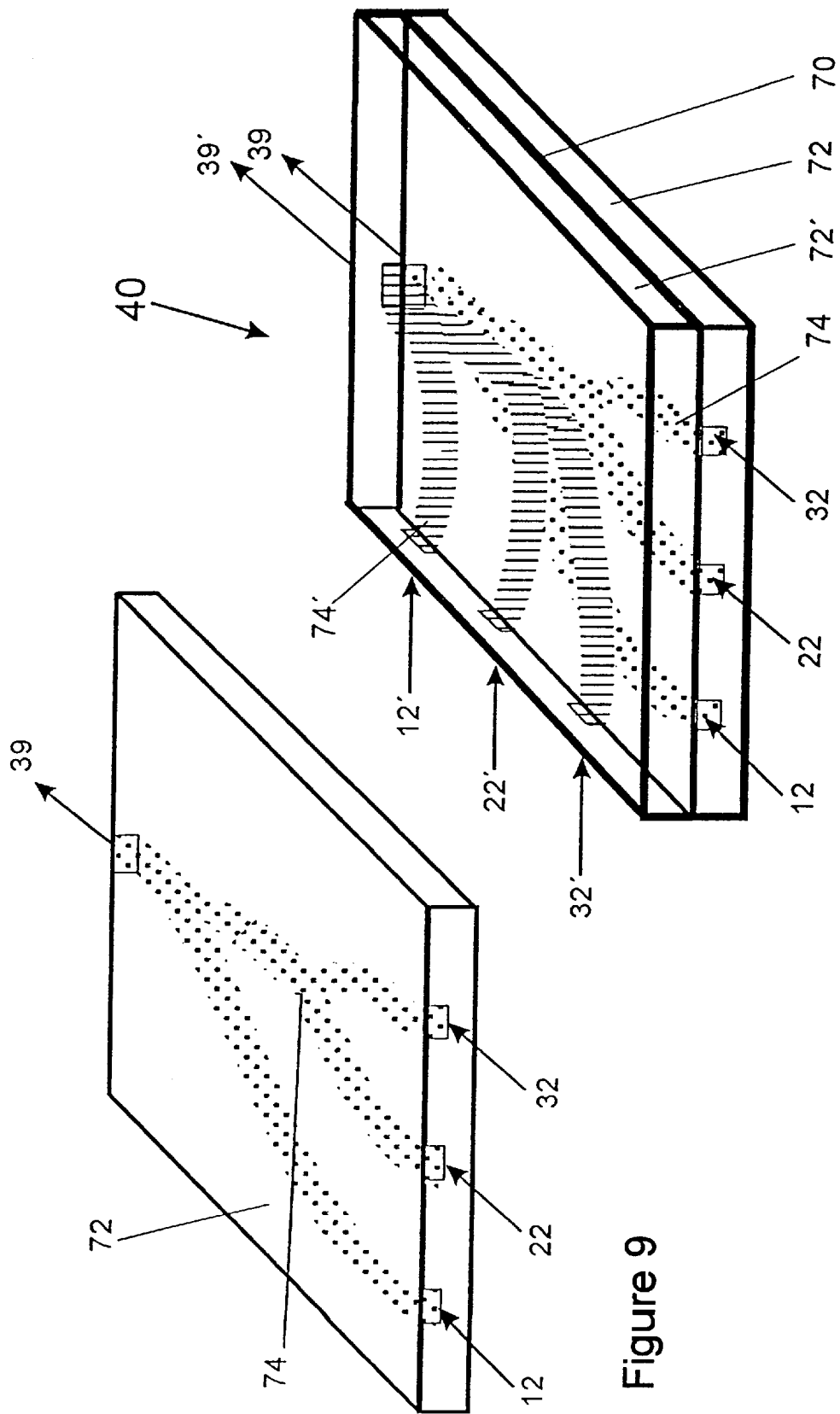

METHOD AND DEVICE FOR DISPLAYING A VIDEO IMAGE AND METHOD FOR THE PRODUCTION OF SAID DEVICE

BACKGROUND OF THE INVENTION a) Field of the Invention

The invention is directed to a device for displaying a video image with a source emitting at least an intensity-modulated light bundle and to a deflecting device for deflecting the light bundle, as well as to the angle-proportional scanning of $N_p$ image points in lines over an angle $\alpha_p$, and to the angle-proportional scanning of the light bundle of $N_z$ lines of the video image over an angle $\alpha_z$. The invention is further directed to a production process for a device of the kind mentioned above for which a source emitting at least an intensity-modulated light bundle and a deflecting device for angle-proportional scanning of $N_p$ image points in lines over an angle $\alpha_p$ and for angle-proportional scanning of $N_z$ lines of the video image over an angle $\alpha_z$ of the light bundle are provided. The invention is further directed to a method for displaying a video image in which at least one intensity-modulated light bundle is emitted from a source and is deflected by means of a deflecting device for angle-proportional scanning of $N_p$ image points in lines over an angle $\alpha_p$ and for angle-proportional scanning of $N_z$ lines of the picture over an angle $\alpha_z$.

By "source" is meant hereinafter not only an individual light generator but also any combination of different light sources arranged in an optional manner.

b) Description of the Related Art

Devices of the type mentioned above are known, for example, from DE 43 24 848 C1. In devices of this kind, light bundles are deflected line-by-line in the direction of a screen corresponding to the electron beam in conventional television. A further deflection vertical to the line scanning serves to scan in the image direction.

During scanning, individual image points are illuminated on the screen, wherein the intensities of the light bundles are controlled with respect to the color and brightness of the respective illuminated image points. Three lasers of different wavelength whose intensity is suitably modulated are provided in the source for color display.

Problems arise in line deflection because it requires a very high frequency. Such deflections are commonly carried out by acoustooptical modulators or, according to DE 43 24 848 C1, with polygon mirrors. However, it is anticipated that the physical boundaries with respect to scan rates will soon be met in impending high-resolution television such as HDTV. Therefore, further developments are necessary in the field of polygon mirrors or acoustooptical modulators.

With a vertical scan rate (frame frequency or field frequency) of 50 Hz, for example, the following frequencies are required for line deflection:

| | |
|---|---|
| PAL interlaced | 15.625 Hz |
| PAL noninterlaced | 31.250 Hz |
| HDTV interlaced | 31.250 Hz |
| HDTV noninterlaced | 62.500 Hz. |

Horizontal scan rates of about 32 kHz are achieved by high-technology polygon mirror wheels. Typical specifications for these polygon mirror wheels are a rotational frequency of 1.250 Hz using 25 facets. Such polygon mirrors and other mechanical mirror deflection systems with similar parameters already practically represent an optimum with respect to attainable dynamics, deflection angle, diameter of the light bundle, freedom from dispersion, noise, construction dimensions, media supply, and costs.

However, the limitations in the dynamics of moving-mass mechanical deflection systems impose limitations on the suitability of these systems, outstanding per se, for applications in the area of high-quality laser projection technology, especially for laser shows or planetaria.

A doubling of the deflection frequency, e.g., by means of doubling the polygon facets, is impossible because of the resulting reduction in the length of the individual facets with the diameter remaining the same. On the other hand, an increase in diameter raises the requirements for the polygon mirror considerably. A doubling the rotating frequency also imposes very exacting requirements on the drive and on the bearing support of the polygon mirror, but especially on its material characteristics, because a doubling of the rotating frequency causes the centrifugal forces to be multiplied and conventional materials cannot withstand these forces beyond a given limit and can lead to the destruction of the polygon mirror.

For these reasons, the demand for increased deflecting frequencies of mechanical deflecting devices cannot easily be met. However, these difficulties may possibly be solved by new materials and new technologies for rapid, mechanically operating light deflecting devices or nonmechanical, especially electrooptical and acoustooptical, beam deflecting devices.

A further problem is posed by the demand for low-divergence light bundles so that a suitable resolution may be achieved. For this reason, lasers are usually used for generating the light bundles in accordance with the state of the art as currently known, for which the emitted light bundle is substantially parallel. However, the limits of currently available laser outputs are quickly reached, particularly in the case of large-image projections. In this regard, it would be conceivable to guide a primary light bundle over a plurality of optical amplifiers to achieve light bundles with higher output which could be combined again in an individual beam. However, only a low and unstable light intensity is available due to coherence and temperature-dependent phase position of the emitted light bundles in the far field.

In order to solve this problem, it is proposed in DE 41 39 842 A1 to divide the video image into different partial images and to display these partial images separately, each with a laser source and associated deflecting devices.

This system is uneconomical and, in addition, has a further disadvantage. In the case of the device mentioned at the start, the picture quality depends on the distance between the projection screen and the deflecting device because of the angle-proportional deflection of parallel light bundles. The picture size changes exclusively as the distance changes, wherein the picture, however, never becomes blurred when the distance changes. This makes it possible, for example, to project images on any curved surfaces so that such devices can also be used in planetaria or for flight simulation and even for new show applications. However, this is not possible in the video devices according to DE 41 39 842 A1 because the individual partial images overlap or separate from one another when the distance changes.

The same disadvantages result from a suggestion according to U.S. Pat. No. 4,796,961 for scanning with polygon mirrors in printing technology. In this case, two laser light bundles are polarized differently and are combined by means of a polarizing beam splitter in such a way that two lines are scanned simultaneously by the same polygon mirror. While this reduces complexity compared with dividing into partial images as in DE 41 39 842 A1, the line density would be dependent on the distance between the screen and the deflecting device when applying this technique in a video device because the light bundles run parallel following the polarizing beam splitter for combining the polarized light bundles. Therefore, this scanning technique cannot be used to overcome the set of problems mentioned above with respect to a video device of the type mentioned at the start.

In a video device according to WO 95/10159, a similar technique is nevertheless used. The light beams proceeding from a laser line are projected onto the deflecting polygon mirror via a lens and deflected jointly for different lines. However, in this case, an angle-proportional line raster scan in different lines is not carried out with the polygon mirror; rather, the entire laser line is displaced in accordance with a tangent dependence over the successively deflecting facets. It is questionable whether a polygon mirror of this kind can even be manufactured since it would require a very precise grinding with respect to the tangent of the deflection angle. Further, an angle-proportional deflection in this process would not produce a homogeneous line density, so that only low-quality pictures could be achieved.

Further, the laser beams reflected by the polygon mirror must be transformed again into a series of image points, for which an additional lens is required. In order to generate the final image size, additional projection optics must be connected following this additional lens to focus on the projection screen so that the above-mentioned advantages with respect to image enlargement as the distance increases and with respect to the independence of the projection surface from shape are not given.

OBJECT AND SUMMARY OF THE INVENTION

It is the object of the invention to improve a video device of the type mentioned in the primary beginning for an increased light output in which the video images generated by this device are sharply imaged regardless of the shape of the projection screen or its distance from the deflecting device. In particular, the invention can also be further developed with respect to increased image point density, so that high-resolution images (HDTV noninterlaced), for example, can even be displayed when scanning by a non-interlaced method.

This object is met for a device of the type mentioned above in that the source emits two light bundles which can be modulated independently from one another, the first light bundle being modulated with the video information for the illumination of a first image point controlled by raster scanning and the second light bundle being modulated with the video information for the illumination of a second image point, wherein the video information of the second image point is offset relative to the video information of the first image point by $m_z$ lines of a frame or picture and $m_\rho$ image points of a line with whole numbers $m_z \leq N_z$ and $m_\rho \leq N_\rho$, and $m_z$ and/or $m_\rho \neq 0$, and in that an optical system is provided which combines the two light bundles at a common real or virtual point situated in front of or inside the deflecting devices in the direction of light propagation, the two light bundles (39, 39') traveling apart proceeding from this real or virtual point at a predetermined angle $m_z \times \alpha_z / N_z$ in the image scanning direction and at a predetermined angle $m_\rho \times \alpha_\rho / N_\rho$ in the line scanning direction.

By means of this device, the method mentioned in the beginning can also be configured in that two light bundles are emitted from the source, the first light bundle being modulated with the video information for the illumination of a first image point controlled by raster scanning and the second light bundle being modulated with the video information of a second image point, wherein the video information of the second image point is offset relative to the video information of the first image point by $m_z$ lines and $m_\rho$ image points with whole numbers $m_z \neq N_z$ and $m_\rho \leq N_\rho$, and $m_z$ and/or $m_\rho \neq 0$, and in that the two light bundles are combined by means of an optical system at a common real or virtual point situated in front of or inside the deflecting device in the direction of light propagation, proceeding from which real or virtual point the two light bundles travel apart at a predetermined angle $m_z \times \alpha_z / N_z$ in the image scanning direction and at a predetermined angle $m_\rho \times \alpha_\rho / N_\rho$ in the line scanning direction.

The device can be produced, according to the invention, in that the source is designed for the emission of two light bundles which can be modulated independent from one another, the first of which light bundles is modulated with the video information for the illumination of a first image point controlled by raster scanning and the second light bundle being modulated with the video information for the illumination of a second image point, wherein the video information of the second image point is offset relative to that of the first image point by $m_z$ lines of a picture and $m_\rho$ image points in a line, with whole numbers $m_z \leq N_z$ and $m_\rho \leq N_\rho$, and $m_z$ and/or $m_\rho \neq 0$, in that an optical system is provided which combines the two light bundles at a common real or virtual point situated in front of or inside the deflecting device in the direction of light propagation, proceeding from which real or virtual point the two light bundles travel apart at a predetermined angle $m_z \times a_z / N_z$ in the image scanning direction and at a predetermined angle $m_\rho \times \alpha_\rho / N_\rho$ in the line scanning direction, and in that the deflecting device is arranged with respect to the two light bundles for synchronous raster scanning of the two light bundles over those image points for which the light bundles are respectively intensity-modulated.

Therefore, similar to U.S. Pat. No. 4,796,961, the advantage results that a plurality of lines are raster scanned by one and the same deflecting device, for example, a polygon mirror, so that the output is increased with respect to the quantity of light bundles used and, further, even the rotating frequency of the polygon mirror can be reduced when, for example, it is additionally provided that the two light bundles scan different lines in an image. However, the invention differs from this technique essentially by reason of the provided optical system. Whereas in U.S. Pat. No. 4,796,961 the two light bundles are guided out of the optical system in parallel, they are combined according to the invention in such a way that they really or virtually traverse a common point and, proceeding from this point, diverge from one another at a defined angle which is characterized exclusively by the angular deflection of the raster scanning of the deflecting device in the image direction. This contradicts the teaching in WO 95/10159 according to which the angles of light bundles of individual lines are determined completely independently from any angle-proportional deflection because of the distance between the relay lens and the polygon mirror, wherein such angle-proportional deflection is not even carried out in this technique. However, the invention goes beyond the state of the art indicated above in that it also permits simultaneous raster scanning of different image points in addition to the simultaneous raster scanning of lines, which has advantageous results especially for increasing the image point brightness.

The position of the point that is predetermined according to the invention at which the two light bundles are combined, namely in front of or within the deflecting device, enables the above-described change of distance between the deflecting device and screen in a particularly advantageous manner as will be immediately apparent from the following remarks. That is, if this point were located, for example, in the middle between the projection screen and the deflecting device, a sharp picture could no longer be achieved after moving the screen into the vicinity of the deflecting device. However, because of the position of the predetermined point according to the invention, the screen can also be moved particularly close to the deflecting device without a loss in quality.

In a preferred further development of the invention which, above all, also benefits a high deflecting rate, an image storage is provided from which the respective lines for the first light bundle and second light bundle can be read out synchronously, and a control device is provided for controlling the sources and/or the deflecting device in order to scan every line of the video image exclusively in each instance by means of one of the two light bundles.

Accordingly, different lines of a video image are always scanned only once. This enables an increased number of lines without having to increase the speed of the deflecting device, particularly the speed of the polygon mirror mentioned above. For example, in the projection of television pictures according to the HDTV standard, a field with 625 lines is generated in the interlaced process at 50-Hz field frequency. However, as is well-known, the image quality in the noninterlaced method, as it is called, is substantially better due to the 50-Hz frame display. The reason for this is that the horizontal lines belonging to each field are only displayed at a frame repetition rate of 25 Hz, although the entire image, as viewed from a greater distance, appears at a field frequency of 50 Hz.

On the other hand, the frame repetition rate of 50 Hz which is made possible by doubling the deflecting speed allows the entire picture to appear virtually without flickering. However, noninterlaced method requires a doubled line frequency which is made possible without substantial technical difficulty by means of the further development of the invention in that two lines are written simultaneously.

Thus, the transition from the interlaced method to the noninterlaced method is facilitated in high-resolution standards without having to increase the line frequency of the polygon mirror mentioned by way of example.

A further possibility would be simply to double the lines with identical video information for increasing the image content. A further possibility consists in an image display by the method of increased resolution as is described in detail, for example, in DE 195 17 357 C1. In particular, a raster scanning of two different image points in the same line ($m_z=0$) can be advantageous for this purpose, wherein in this case, for example, the first light bundle writes the first half of the line and the second light bundle simultaneously writes the second half. In this way, twice as many image points can be written in half the scanning time for one line compared with the prior art.

Further, it is also possible to display images in 62.5-kHz interlaced mode with a polygon mirror and a raster scanning frequency of 31.25 kHz when four light bundles are simultaneously intensity-modulated and color-modulated with the image information of each line and are imaged simultaneously by the deflecting device provided according to the invention. Further, the brightness of the projected image can be substantially increased by means of this solution. Due to the fact that lines written by different light bundles are superposed on one another, it is no longer necessary to spatially unify the light bundles, which, as was explained above, formerly caused problems with respect to the increase in and stability of the output density in the far field.

The number $m_z$, according to the invention, between the line number of the first light bundle and that of the second light bundle can be freely selected, in principle, up to a maximum line number $N_z$. For example, it is possible to scan the first, second, third line, etc. with the first light bundle, while the second light bundle scans the 313th, 314th, 315th line, etc.; that is, in a 625-line image, the top half is generated by one light bundle and the bottom half is generated by the other light bundle. This was not possible, for example, in the prior art given by U.S. Pat. No. 4,796,961, since, according to the teaching given therein, the points of impingement on the polygon mirror in that type of operation would be spaced very far apart resulting in uncontrolled deflections due to different pyramidal errors for the two light bundles in different lines because of a possible curvature of the facets of the polygon mirror.

According to the invention, however, this type of display is possible when, for example, the common point from which the light bundles proceed resides in the vicinity of the facet surface, or even on the facet surface, of the polygon mirror due to the configuration of the optical system, since both light bundles are always imaged by the same part of the polygon mirror.

However, apart from the virtually freely selectable numbers $m_z$ and $m_p$, the control device mentioned above could be very uneconomical in the event of an unfavorable selection of these number when, for example, it must be ensured that every image point of the video image is scanned by only one of the light bundles.

Therefore, in an advantageous further development of the invention, it is provided that the first light bundle is either guided only over odd line numbers or only over even line numbers and the number $m_z$ is odd.

This substantially reduces control complexity because the first light bundle is then guided, for example, over lines 1, 3, 5 . . . , while the second light bundle is guided, for example, at $m_z=3$, simultaneously therewith over lines 4, 6, 8 . . . . This automatically prevents both light bundles from writing the same line. This prevents individual image points from appearing in a higher intensity, namely at twice the intensity in the case of two light bundles, due to multiple illumination.

This drastically reduces the complexity of the electronics compared with other solutions in which the readout of different lines had to interlocked so that some lines would not be written by both light bundles during one image cycle.

On the other hand, if the light bundles should write the same image points, it is provided in accordance with a preferred further development that the first light bundle is guided over consecutive line numbers for raster scanning a complete image. In this case, the second light bundle also writes the entire image independently from the numbers $m_z$ and $m_p$. The image point intensity over time is therefore doubled in every video image when two light bundles are used.

In another advantageous further development of the invention, it is provided that the deflecting device has a polygon mirror for scanning $N_p$ image points in the line direction and the common point of the light bundles lies on the respective deflecting facet of the polygon mirror.

Accordingly, both light bundles are deflected from the same point on the polygon mirror, different pyramidal errors for the lines of the two light bundles in the eventuality of a small curvature of the polygon mirror facet are prevented in this way, so that only one pyramidal error correction is required in the event of faulty deflection.

In another advantageous further development of the invention, the deflecting device has a swivel mirror for the raster scanning of $N_z$ lines of the video image in the image direction, and the common point lies on the surface of the swivel mirror.

With the swivel mirror, the light bundle which is deflected in the line direction by the line mirror, for example, the polygon mirror, is further deflected in different line directions. Therefore, when the common point lies on the surface of the swivel mirror, the same optical conditions are given for the lines which are scanned simultaneously according to the invention as those given, for example, in the device according to DE 43 24 848 C1. In this way, the requirement that the same line density is achieved independent from the position of the projection screen relative to the deflecting device is met in a particularly favorable manner. This is also the case in other positions of the starting point of the two light bundles when the projection screen is at a very great distance from the deflecting device, but very small pictures can also be advantageously realized in this case when the projection screen is close to the deflecting device, for example, when very compact video equipment for small image dimensions is required.

In another preferred further development of the invention, a light guide is provided for each light bundle, the light bundle being introduced into the light guide proceeding from the source. The ends of the light guides on the output side are fixed at a distance and a focussing device is provided following the light guide on the output side, wherein the outputs of the light-conducting fibers lie in the input-side focal plane of the focussing device so that the light from the respective light guide is parallelized on the one hand and the two light bundles are combined in a point while forming the predetermined angles $\alpha_\rho$ and $\alpha_z$ on the other hand.

Due to this further development, the optical system provided according to the invention can be realized in a particularly simple way as will be shown especially hereinafter with reference to embodiment examples. On the one hand, the light guides provide an inexpensive optical system for combining the light bundles to be deflected simultaneously in different lines. Further, the adjusting or aligning requirements for the source are reduced compared with other optical systems because the light guides are joined at a defined distance. Therefore, in this respect, there is no longer any need for adjustment of the source for location and angle. Moreover, the light emerging from the light guide can be parallelized in a simple manner by means of this focussing device and the angle can be adjusted in a defined manner as a function of the distance of the light guides from the first principal plane of the focussing device. In the simplest case, the focussing device is a lens with positive power, which shows the extent to which it is possible to economize on the optical system according to this further development.

In another advantageous further development, at least one light guide is arranged on the output side at an angle to the optical axis of less than 30° and, in particular, less than 1°. As a result of the additional degree of freedom of the angular adjustment of the light guide and accordingly of the light bundle, the location of the common point is selectable within a wider range compared with a parallel arrangement of the two light guides. Accordingly, the device can be optimized in a simple manner. The indicated upper limits for the angles have proven particularly suitable in practical tests.

According to a preferred further development of the invention, complexity is reduced still further when the light guides are provided in an integrated optical component because integrated optical components can be produced economically with close manufacturing tolerances. Further, the required distance between the outputs of the light guides can be fixed in a particularly well-defined manner because of the close manufacturing tolerances made possible in this way.

It has proven particularly advantageous for scanning very closely adjacent lines of a video image when, in accordance with an advantageous further development of the invention, the distance between the outputs of the light guides is greater than 10 μm, especially greater than 30 μm, and less than 1 mm because, in this way, on the one hand (greater than 10 μm), two very close lines can be written in a simple manner jointly for the first light bundle and the second light bundle without light information passing, for example, via leakage field coupling, from one light guide to the other and, on the other hand (less than 1 mm), the joining point can be selected essentially independent from the position of the deflecting polygon mirror facets, as was already mentioned.

Another advantageous possibility is given in accordance with a preferred further development of the invention in which the light guides are light-conducting fibers having a core and cladding which are joined on the output side, wherein the cladding of each light-conducting fiber is flattened at the location where they are joined, so that the cores of the two light-conducting fibers are at a small distance of greater than 10 μm on the output side. This results in the same advantages as those described above, but in this case flexible light-conducting fibers are used as light guides, which has the further advantage that while the outputs of the light-conducting fibers are connected with one another at the required distance in a mechanically rigid manner, the inputs of the light guides can be shifted to virtually any desired located due to their flexibility. This means that a particularly economical compact video device can be realized because of this further development since the location and the orientation of the light generators are freely selectable.

The disadvantage of leakage field coupling between light guides was already mentioned above. Specifically, as a result of this coupling, a light bundle is not guided only in the light guide because a portion of the electrical field also emerges vertical to the propagation direction from the Sight guide because of the wavelength diverging from zero. When light guides are located very close together, this leakage field can excite a mode in the other light guide. As was already indicated, this can be prevented by means of a suitably large distance between the centers of the light-conducting parts of the light guides.

However, it is also possible to keep the distance smaller by providing a reflecting surface at the contact surfaces of the light-conducting fibers. Due to the reflective coating, the leakage fields are reflected so that they cannot influence the other respective light guide. However, experience has shown that this results in an attenuation which must be compensated by a conical widening, or taper, of the core which, under unfavorable circumstances, no longer permits a small distance for generating small angles $\alpha_\rho$ and $\alpha_z$.

In another advantageous further development, it is provided that the deflecting device has a mirror which is movable in two directions, both light bundles converging on the surface of this mirror at the common point at the predetermined angle, proceeding from which point the light bundles are then reflected, and that a drive is provided for a nutating or spiral movement of the movable mirror, wherein the lines for quantity $m_z$ are numbered or counted in radial direction and the image points for quantity $m_\rho$ are numbered or counted in the advancing or progressing direction of the spiral scanned in this manner.

A spiral-type raster scanning has advantages for projection carried out in polar coordinates. It is advantageous, for example, in flight simulators or in planetaria because in these cases the image content is usually displayed on a spherical or partially spherical surface. Spiral raster scanning techniques are known, for example, from U.S. Pat. No. 3,569,616.

The completely different kind of geometry for purposes of projection on a plane surface at first makes the use of the invention in such raster scanning techniques with spiral deflection appear unlikely. However, with the indicated suitable selection of the line point coordinates and image point coordinates with respect to radius and circumference, the invention can surprisingly also be used, which results in the advantages described above also for this type of scanning. This example also shows that the concept of line and image point must be understood in an essentially more general sense than would be expected from the scanning techniques known from television.

The foregoing remarks relate only to two image points and two light bundles. However, more than two light bundles can also be advantageously used for lines associated therewith, respectively, wherein the indicated number two represents a partial amount or subset of this plurality of lines and image points and of the plurality of light bundles.

In an advantageous further development of the invention, it is provided, especially for more than two light bundles, that the source emits four light bundles which can be modulated independent from one another, two of which light bundles write different image points at an angle $\alpha_\rho$ of a first line of an image and the two other light bundles write different image points at an angle $\alpha_\rho$ in a second line which is offset relative to the first line by $m_z$ lines. Accordingly, the advantages of simultaneously writing different image points in one line and simultaneously writing different lines can be realized in an individual device. In particular, in a preferred further development for this purpose, the source points of the light bundles considered in the direction of light are arranged rectangularly on a focal plane of an optical device. The resulting arrangement, which is symmetrical in two directions, is above all advantageous with respect to the accuracy of the image projection because, as a result of this further development, when the two image points are imaged at angle $\alpha_\rho$ in a line the desired image point position is also ensured at the same time in the simultaneously scanned line which is offset by $m_z$.

The invention will be described more fully hereinafter in principle with reference to the accompanying drawings.

BRIEF DESCRIPTION OF THE DRAWINGS

In the drawings:

FIG. 9 is a perspective view of an integrated waveguide coupler for combining light bundles of different wavelength;

FIG. 10 shows an optical system for use in the device in FIG. 1 with two waveguide couplers according to FIG. 8;

FIG. 1 shows a laser projection device such as can be used, for example, to display color video images in laser show theaters, planetaria, flight simulators or in the home. The projection device according to FIG. 1 is directed especially to the display of color images. Three lasers 10, 20, 30 are provided for mixing three primary colors, these three lasers 10, 20, 30 emitting three eight bundles 12, 22, 32. The lasers 10, 20, 30 emit light of a suitable wavelength for generating image points of a video image. For monochrome images, on the other hand, only one laser is necessary. However, the following statements pertain exclusively to color images by way of example. Modifications for monochrome devices are readily possible by limiting to one monochrome laser.

Figure 1:
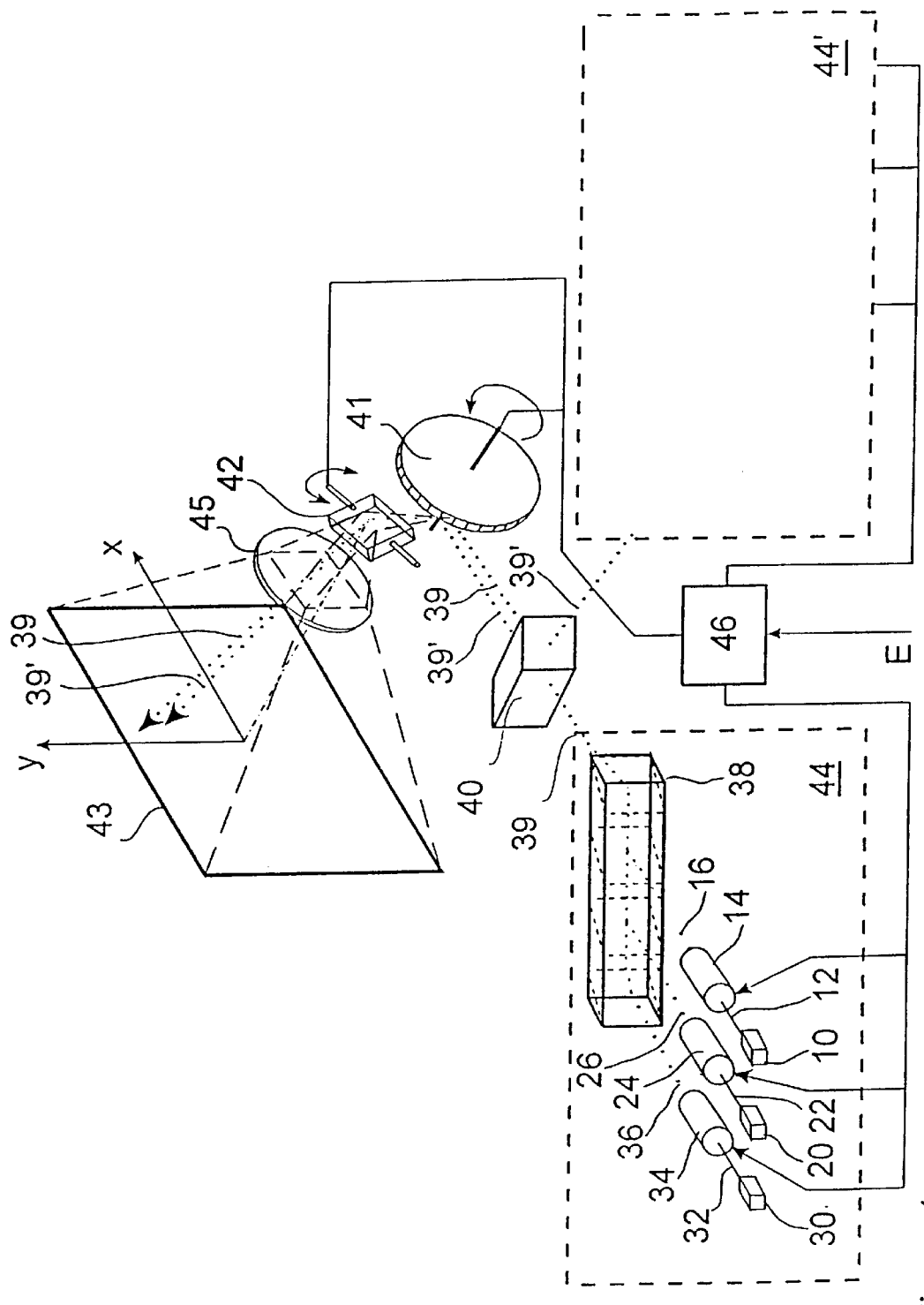
FIG. 1 is a schematic view of a device, according to the invention, for displaying video images.

The lasers 10, 20, 30 were operated statically. Therefore, for controlling the lasers with respect to image points color and brightness, the three light bundles 12, 22, 32 are modulated by separate modulators 14, 24, 34. Modulators of this kind can be dispensed with if the lasers 10, 20, 30 are laser diodes, for example, which are controlled directly via their power supply and are modulated by means of the latter.

The brightness and the color of the individual image points are controlled by the modulators 14, 24, 34 in a manner comparable to the control of electron guns in known television technology using picture tubes.

After exiting the modulators 14, 24, 34, the light bundles 12, 22, 32 are combined to form a total light bundle 39 by means of a beam combining device 38 which, in the embodiment example, was a mirror system comprising dichroitic mirrors. This part of the device is an intensity-modulated, color-modulated light source 44.

The total or combined light bundle 39 enters an optical system 40 to which a light bundle 39' generated in an identical manner by its own separate light source 44' which can be color-modulated and intensity-modulated is guided in addition.

The light bundle 39 is provided for writing a line, while light bundle 39' is used for synchronous writing of a line which is offset by $m_z$ lines relative to the line written by light bundle 39. Further, the image points can also be offset relative to one another in the different lines, in this case by a number $m_\rho$. However, the following examples are essentially restricted to $m_\rho=0$, unless otherwise noted, since the essential features of the invention can be illustrated exclusively by simultaneous scanning of different lines.

By reason of the function that will be described more fully hereinafter, $m_z$ can represent the line distance number or line spacing number.

For the purpose of synchronous deflection of two light bundles 39 and 39' in different lines, the device shown in FIG. 1 has an optical system 40 which combines or separates the two light bundles 39 and 39' at an angle, so that these light bundles 39 and 39' appear to proceed from a real or virtual common point during the subsequent image projection.

The light bundles 39 and 39' lie in a plane vertical to the line deflection when $m_\rho=0$. The angle set by the optical system is determined for a fixed line spacing for $m_z$ lines, where $m_z$ is a whole number less than the number $N_z$ of the effective lines of the video image, as will be explained in more detail hereinafter, For a better understanding of the deflection principle used in this device, reference is had to the raster scanning technique employed in known television technology using picture tubes. The technique employed herein differs from the former technique in that light bundles 39, 39' are used instead of electron beams for generating image points of the video image and the magnetic deflection conventional in picture tubes is replaced by mechanical scanning by means of a line mirror 41, a polygon mirror in the embodiment example, and an image mirror 42, a swivel mirror in the embodiment example. However, in laser and video projection devices of this kind, scanning is not limited to the described mechanical aids. It can also be carried out, for example, by acoustooptical means.

FIG. 1 also shows expansion optics 45 which serve in the embodiment example to enlarge the video image in the case of small deflection angles. For this purpose, the expansion optics 45 are constructed as an afocal lens system which is corrected in accordance with the tangent condition. Since the expansion optics 45 assist in determining the deflection angle of the bundle on the screen, they are considered part of the deflecting device. However, as concerns the invention, all values, for example, for angles $\alpha_\rho$ and $\alpha_z$ and portions thereof, are given in front of these expansion optics.

In the embodiment example, the two light bundles 39 and 39' are deflected on a screen 43 in two dimensions by means of a deflecting device comprising a line mirror 41 and an image mirror 42 so as to sequentially illuminate individual image points of the video image to be generated. This screen 43 can be flat for displaying conventional television images as is shown in FIG. 1. However, in planetaria and in flight simulators, the screen 43 is preferably constructed in a curved manner.

The screen 43 can generally also be formed as a front projection or rear projection screen, depending on whether the person observing the picture is situated, as prescribed, on the side of the optics 45 or on the opposite side with respect to the screen 43.

The device for displaying video images comprises, as a component part of the device, a specially adapted electronic controlling unit 46 for the modulators 14, 24, 34, 14', 24' and 34'.

The video information that is temporarily stored in the control unit 46 is read out synchronous with the respective position of the line mirror 41 (polygon mirror wheel) and image mirror 42 (galvanometer mirror) and is then used for the intensity modulation and color modulation of the light bundles 39 and 39' as will be illustrated in more detail with reference to the control shown in FIG. 11.

First, basic specifications for important television standards will be given with respect to the present invention:

PAL noninterlaced (frame)

| | |
|---|---|
| A scanned image has effective lines ($N_z$): | 575 |
| absolute lines: | 625 |
| frame frequency: | 50 Hz |
| time for scanning one line: | 32 µs |

-continued

| | |
|---|---|
| angle $\beta_z$ between two lines in the image at a deflection angle of the image mirror $\alpha_z = 15°$: | 0.026° |
| line spacing with screen at a distance of 6 m (without projection optics 45): | 2.7 mm |
| image height at a distance of 6 m: | 1.6 m |
| idle lines: | 49 |
| idle time: | 1.6 ms |
| In this case, a scanned line has an effective number of image points ($N_p$) of: | 720 |
| a width-to-height ratio of 4:3 gives a deflection angle of the line mirror 41 of: | 20° |
| angle $\beta_p$ between two image points in a line at an angle of the line mirror $\alpha_p = 20°$: | 0.0277° |
| image point spacing with screen at a distance of 6 m (without projection optics): | 2.9 mm |
| image width at a distance of 6 m: | 2.1 m |
| time for scanning one line: | 32 µs |
| idle time: | 3.2 µs |
| HDTV interlaced (field type method) | |
| A scanned image (field) has effective lines ($N_z$): | 575 |
| absolute lines: | 625 |
| a frame has effective lines: | 1152 |
| absolute lines: | 1250 |
| frame frequency: | 25 Hz |
| field frequency: | 50 Hz |
| angle $\beta_z$ between two lines in the image at an angle of the image mirror $\alpha_z = 15°$: | 0.026° |
| line spacing with screen at a distance of 6 m without projection optics: | 2.7 mm |
| image height at a distance of 6 m: | 1.6 m |
| idle lines: | 49 |
| idle time: | 1.6 ms |
| In this case, a scanned line has an effective number of image points ($N_p$) of: | 1440 |
| a width-to-height ratio of 16:9 gives a deflection angle of the line mirror of: | 26.77° |
| angle $\beta_p$ between two image points in a line at an angle of the line mirror $\alpha_p = 26.7°$: | 0.0185° |
| image point spacing with screen at a distance of 6 m (without projection optics): | 2 mm |
| image width at a distance of 6 m: | 2.8 m |
| time for scanning one line: | 32 µs |
| idle time: | 3.2 µs |
| HDTV noninterlaced (frame) | |
| A scanned image has effective lines ($N_z$): | 1152 |
| absolute lines: | 1250 |
| frame frequency: | 50 Hz |
| time for scanning one line: | 16 µs |
| idle lines: | 98 |
| idle time: | 1.6 ms |
| angle $\beta_z$ between two lines in the image at an angle of the image mirror $\alpha_z = 15°$: | 0.013° |
| line spacing with screen at a distance of 6 m (without projection optics): | 1.4 mm |
| image height at a distance of 6 m: | 1.6 m |
| In this case, a scanned line has an effective number of image points ($N_p$) of: | 1440 |
| a width-to-height ratio of 16:9 gives a deflection angle of the line mirror of: | 26.77° |
| angle $\beta_p$ between two image points in a line at an angle of the line mirror $\alpha_p = 26.7°$: | 0.0185° |
| image point spacing with screen at a distance of 6 m (without projection optics): | 2 mm |
| image width at a distance of 6 m: | 2.8 m |
| time for scanning one line: | 16 µs |
| idle time: | 1.6 µs |

Basically, the following relationships can be derived from the above: In the PAL noninterlaced and HDTV interlaced display methods, there are 49 idle lines with an idle time of 1.6 ms between two images:

The idle time between two lines is 3.2 µs.

The deflection angle $\alpha_z=15°$ of the image mirror and the effective line number $N_z=576$ give the same values for both display methods for the angle between two lines $\beta_z=0.026°$.

In the PAL noninterlaced display method, that is, with a width-to-height ratio of 4:3, the deflection angle of the line mirror is $\alpha_\rho=20°$. In connection with the effective image point number per line of 720, there is an angle $\beta_\rho=0.0277°$ between two adjacent image points of a line.

In the HDTV interlaced display method, width-to-height ratio of 16:9, there is a deflection angle of the line mirror of $\alpha_\rho=26.77°$. In connection with the effective image point number per line of 1440, there is an angle $\beta_\rho=0.0185°$ between two adjacent image points of a line.

In the HDTV noninterlaced display method, there are 98 idle lines with an idle time of 1.6 ms between two pictures. The idle time between two lines is 1.6 $\mu$s.

In this case, the doubling of the effective line number $N_z=1152$ results in a halving of the angle between adjacent lines to $\beta_z=0.013°$.

In the HDTV noninterlaced display method with a width-to-height ratio of 16:9, there is a deflection angle of the line mirror of $\alpha_\rho=26.77°$. In connection with the effective image point number per line of 1440, there is an angle $\beta_\rho=0.0185°$ between two adjacent image points of a line.

Therefore, there are similarities with respect to imaging characteristics of the collinear light bundles 39, 39' when images are scanned using the PAL noninterlaced and HDTV interlaced methods. The idle time between two pictures, however, is 1.6 $\mu$s in all display methods.

It is possible by means of mathematical-electronic methods to adapt any image size to the imaging characteristics of the respective device so that the image quality is improved (as is described in DE 195 17 357 C1, for example). For adhering to the conditions which must be taken into account for this purpose, scanning according to the invention simultaneously in a plurality of lines and a plurality of image points in a line is extremely advantageous as will become more clear hereinafter in the example of a device with image display based on the HDTV noninterlaced method with simultaneous writing of a plurality of lines during the scanning of an image.

The information provided above with regard to the simultaneous display of image points within different lines can be applied to the statements concerning multiple scanning of a plurality of image points in the same line in that the indicated dimensions, dimensional ratios, times, and time ratios are used corresponding to the information given above, wherein the index "z" is replaced by "$\rho$". The "z" index refers to the lines to be scanned within an image, while the "$\rho$" index refers to the image points to be scanned simultaneously within a line.

The statements below apply equally to optional writing of image points in traces independent from of a line standard, for example, in polar coordinates for a projection on a dome as will be made clear hereinafter with reference to FIG. 3.

The image points are always displayed in a sharp manner regardless of the shape of the screen 43 or the distance between the screen 43 and the deflecting device comprising line mirror 41 and image mirror 42. The reason for this is that the light bundles impinging on the screen are virtually parallel and their divergence is substantially determined by that of the laser sources 10, 20, 30. However, when the distance between the screen 43 and the deflecting device is increased, the image size also changes. This is made possible because both the line deflection and the image deflection are angle-proportional, which also follows from the deflection by means of mirrors 41 and 42 shown in FIG. 1.

However, in the embodiment example in FIG. 1, the individual lines are not scanned with an individual light bundle, but rather by two light bundles 39 and 39' via the line mirror 41 synchronously in different lines. Accordingly, a higher luminous density can be achieved in the displayed image on the one hand, and an image can also be written at the deflection speed of the line deflecting mirror 41 with twice the number of lines, which, as was already explained, is especially advantageous for the design of a polygon mirror used as line mirror 41 in the embodiment example and even makes it possible to display HDTV pictures in noninterlaced operation with available polygon mirrors at the customary deflecting speed.

In the embodiment example, the two light bundles 39 and 39' exit the image mirror 42 at a constant angle relative to one another because of the optical system 40, the magnitude of this angle being proportional to the line spacing number $m_z$ selected for this type of operation. The particular way in which this is carried out will be explained hereinafter with reference to the embodiment examples in FIGS. 4 to 10.

The angle defined between the light bundles 39 and 39' by the optical system 40 can also be determined from FIG. 1. At a total deflection angle $\alpha_z$ of the image mirror 42 for $N_z$ lines of the video image to be displayed, an angle of magnitude $\beta_{mz}=m_z \times \alpha_z/N_z$ results for a difference of $m_z$ lines between the light bundles 39 and 39'. The angular distance between two directly adjacent lines ($m_z=1$) is represented hereinafter by $\beta_z=\alpha_z/N_z$. This applies in a corresponding manner for writing different image points ($m_\rho \neq 0$) $\beta_{m\rho}=m_\rho \cdot \alpha_x/N_\rho$ and $\beta_\rho=\alpha_\rho/N_\rho$ where $\alpha_\rho$ is the total scanned line beam angle or opening angle and $N_\rho$ is the number of image points in a line.

Basically, it is necessary to distinguish between several cases of scanning depending on whether the selected line spacing number $m_z$ is even or odd and whether an individual light bundle writes even, odd or whole-number line numbers. Only the most important combinations for image display are described in the following.

Case 1:

The line spacing number $m_z$ is odd and the light bundle 39 writes only odd lines. As a result, every image line is written once at most during the scanning of an image.

This case is used primarily for increasing the line number per image with the deflecting frequency of the line mirror remaining constant, although it is also possible to write with the same video information when doubling the line number of directly adjacent lines, so that exclusively an increase in the light output of the image is carried out in the time average.

| | | | | | | |
|---|---|---|---|---|---|---|
| light bundle 39 always writes odd lines: | | 1 | 3 | 5 | 7 | ... |
| light bundle 39' always writes even lines: | | | | | | |
| specifically, at | $m_z = 1$ | 2 | 4 | 6 | 8 | ... |
| | $m_z = 3$ | 4 | 6 | 8 | 10 | ... |
| | $m_z = 5$ | 6 | 8 | 10 | 12 | ... |
| | etc. | | | | | |

In HDTV noninterlaced display, the angle between two lines is $\beta_z=0.013°$. Therefore, depending on the line spacing number $m_z$, the following line beam angles $\beta_{mz}$ are given:

| | |
|---|---|
| $m_z = 1$ | $\beta_{1z} = 0.013°$ |
| $m_z = 3$ | $\beta_{2z} = 0.039°$ |
| $m_z = 5$ | $\beta_{3z} = 0.065°$ |
| $m_z = 7$ | $\beta_{7z} = 0.091°$ |
| $m_z = 9$ | $\beta_{9z} = 0.117°$, and so on. |

Case 2:

The line spacing number $m_z$ is even and the light bundle 39 writes all lines successively. As a result, the lines illuminated by the light bundles 39 and 39' during the scanning of an image are written twice. This case is used primarily for increasing the light output of the displayed image:

| light bundle 39 writes every line: | | 1 | 2 | 3 | 4 | ... |
|---|---|---|---|---|---|---|
| light bundle 39' writes lines: | | | | | | |
| specifically, at | $m_z = 2$ | 3 | 4 | 5 | 6 | ... |
| | $m_z = 4$ | 5 | 6 | 7 | 8 | ... |
| | $m_z = 6$ | 7 | 8 | 9 | 10 | ... |
| | etc. | | | | | |

It can be seen that lines 3, 4, etc., for example, are written at different times, but are written twice within one image.

In HDTV noninterlaced display, the deflection angle between two lines is $\beta_z = 0.013°$. Therefore, depending on the line spacing number $m_z$, the following line beam angles $\beta_{mz}$ are given:

| | |
|---|---|
| $m_z = 2$ | $\beta_{2z} = 0.026°$ |
| $m_z = 4$ | $\beta_{4z} = 0.052°$ |
| $m_z = 6$ | $\beta_{6z} = 0.078°$ |
| $m_z = 8$ | $\beta_{8z} = 0.104°$ |
| $m_z = 10$ | $\beta_{10z} = 0.13°$, and so on. |

In case 1, the line beam angles $\beta_{mz}$ between the light bundles 39 and 39' were calculated in such a way that the simultaneously written lines always have the same angular spacing, while in case 2 the angles $\beta_{mz}$ of the light bundles 39 and 39' are calculated in such a way that all lines are written exactly on one another This is particularly advantageous for the above-mentioned configuration for writing two different image points ($m_\rho \neq 0$) in a line by means of light bundles 39 and 39' for output scaling.

It is further shown that in the case of small deviations in real optical arrangements, high-quality images can still be generated by the exactly calculated angles $\beta_{mz}$ of the light bundles 39 and 39' because deviations in the angle $\beta_{mz}$ are constant within a given device and equally within an image raster scanning interval, so that no noticeable image errors are generated by small deviations.

In the case of large error angles, however, the modulators in the light sources 80 and 80' can be controlled in a time-corrected manner corresponding to the angle $\beta_{mz}$. This variant is sufficient in particular in the case of an increased output by means of multiple scanning of every line. The requirements for manufacturing precision of the optical arrangement are even lower than in the prior art because imaging errors can be influenced by a correspondingly designed electronic control in such a way that they are not perceived by the observer.

Figure 2:
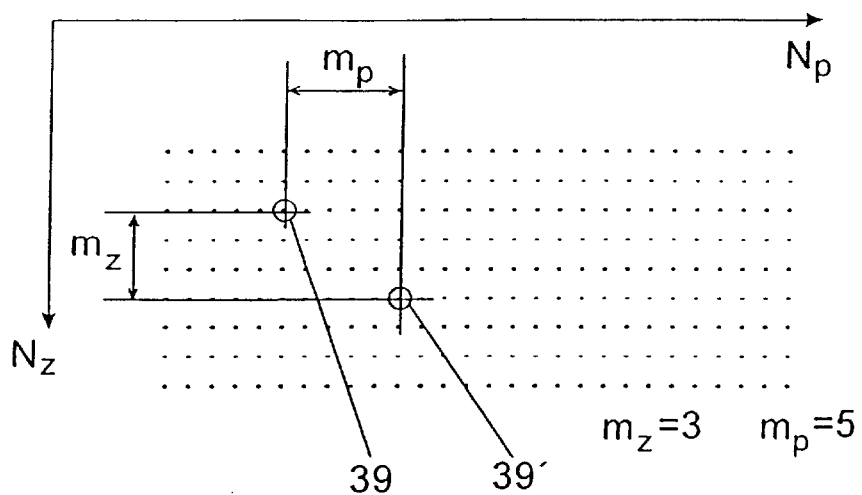
FIG. 2 shows an example for the scanning of video images in Cartesian coordinates.
Figure 3:
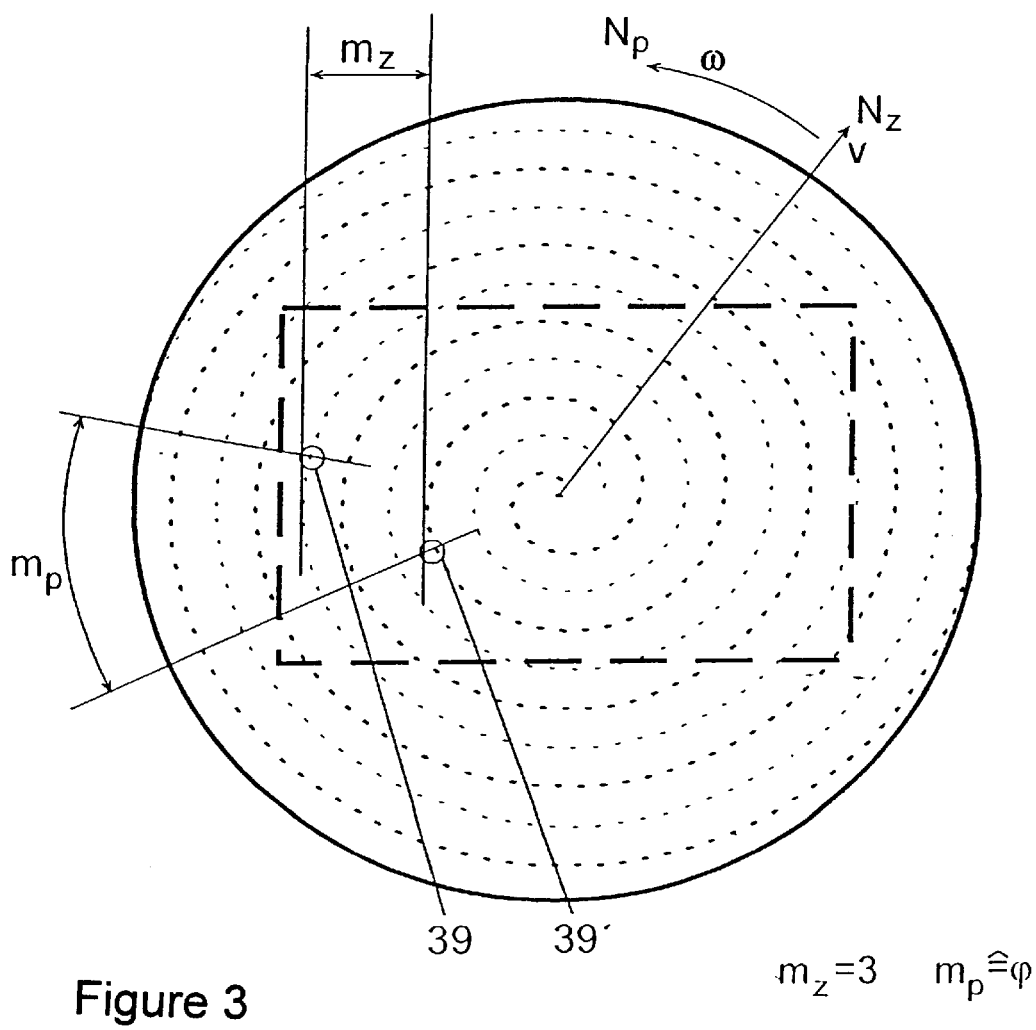
FIG. 3 shows an example for the scanning of pictures in planar polar coordinates.

FIGS. 2 and 3 show schematically two ways of scanning to illustrate the values $m_z$ and $m_\rho$. The point of incidence of the light bundle 39 and of the other light bundle 39' is represented by two points. Also, the deflecting devices for line scanning and image scanning are illustrated by two vectors designated by $N_\rho$ and $N_z$. FIG. 2 shows a raster scanning in two dimensions as it is generated by image mirror 42 and line mirror 41 with the values for $m_z$ and $m_\rho$ shown in the image direction and in the line direction as was explained more fully with reference to the example in FIG. 1.

In contrast, FIG. 3 shows a spiral scanning, for example, for projection on a dome in spherical segments. However, scanning in a rectangle is also possible with spiral scanning, as is indicated in FIG. 3 by dashed lines. In that case, the light bundles are advisably blanked when they scan outside of the rectangle. This spiral scanning can be generated, for example, by a galvanometer mirror which is tiltable in two directions by means of a corresponding sine-shaped (in one direction) and cosine-shaped (in the other direction) control at an angular speed W. At a constant amplitude of the sine voltage waveform and cosine voltage waveform, the light bundles 39 and 39' are deflected in a circular pattern. On the other hand, if the amplitude is increased uniformly over time, the spirals shown in the Figure occur.

Further, FIG. 3 shows the values $m_z = 3$ and $m_\rho$ in order to clarify how the definition of lines and image points should be selected in types of scanning other than rectangular scanning. In the spiral scanning according to FIG. 3, the counting of the lines is effected in the radial direction and the counting of the image points is carried out in the circumferential direction.

It will be shown in the following with reference to a few examples how the optical system 40 can be realized for practical use in the embodiment example in FIG. 1.

Figure 4:
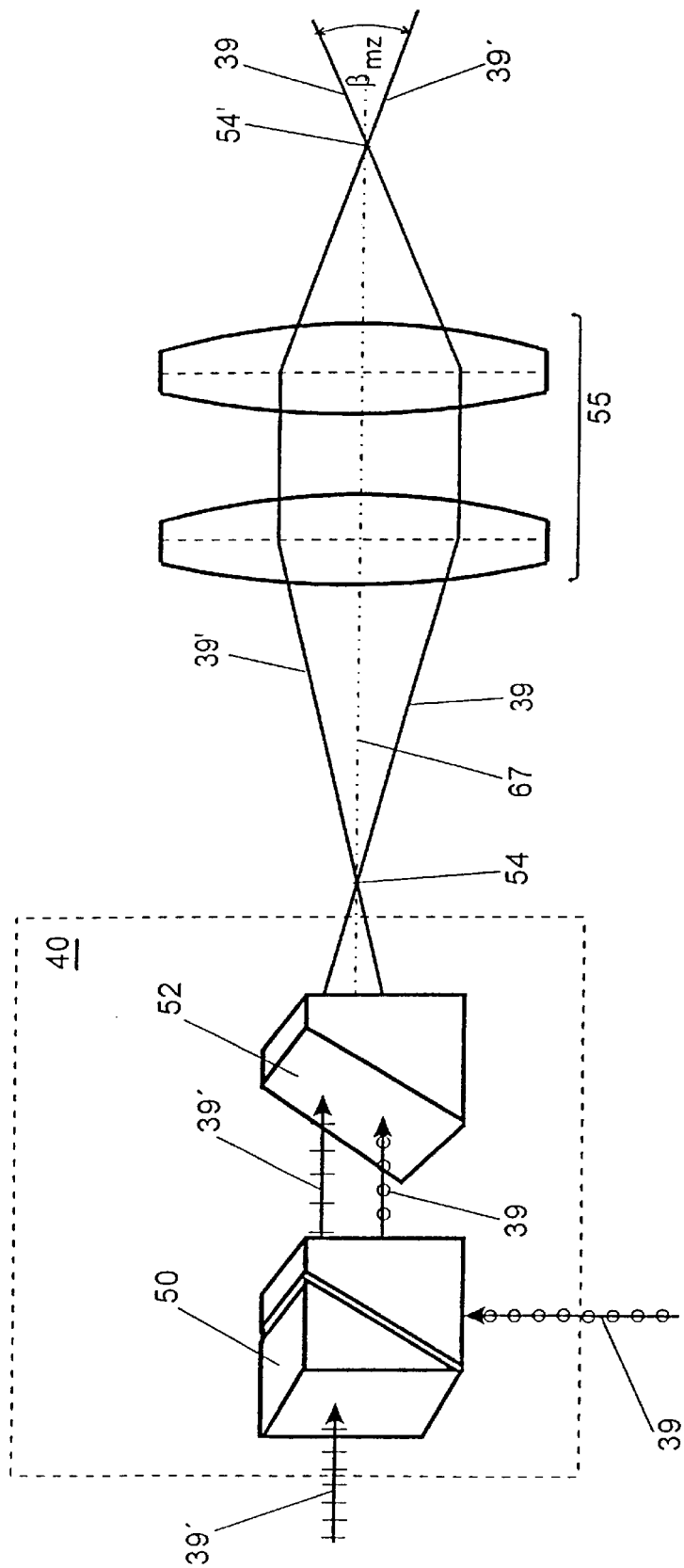
FIG. 4 is a schematic view of an optical system for use in the device shown in FIG. 1.

FIG. 4 shows a top view of an optical system 40 shown by way of example, in which the two light bundles 39 and 39' are polarized vertical to one another and combined by means of a polarizing beam splitter 50 arranged in an operating mode which is the reverse of the prescribed operating mode.

After exiting the polarizing beam splitter 50, both light bundles 39, 39' enter a prism 52 which is made from birefringent material and by means of which an angle of inclination is generated between the two light bundles 39 and 39' due to the different indices of refraction for the two polarizing directions.

According to FIG. 4, the light bundles 39, 39' exit the polarizing beam splitter 50 in parallel at a distance that is already predetermined by the incidence conditions of the polarizing beam splitter 50. Because of the angular change between the two light bundles 39, 39' caused by the prism 52, these light bundles 39, 39' are combined in a common point 54. As far as possible, this common point 54 should lie between the optical system 40 and the image mirror 42 so that the line density in the video image is independent from the distance of the projection screen 43 from the deflecting device.

The optical system 40 is most advantageously dimensioned (at $m_z \neq 0$; $m_\rho = 0$) in such a way that the point 54 lies on the surface of the image mirror 42, because the angle adjusted by the optical system 40 is then effected essentially at the same location as the change in angle for the line scanning of the video image. This means that the line scanning proceeds from the same location for all lines.

On the other hand, it can also be advantageous for certain applications, in particular $m_\rho \neq 0$; $m_z = 0$, to situate this point 54 on the reflecting facet of the polygon mirror used as line mirror 41, since the line deflection is then carried out for both light bundles 39 and 39' at the same point of the facet.

If point 54 is to be shifted to another point 54', this can be carried out by means of further optics 55 which are advantageously designed as an afocal lens system for this purpose. Optics 55 of this kind can also be used in addition to change the angle at which the light bundles 39 and 39' converge at point 54'. Therefore, an optical system of this kind provides a further degree of freedom by means of which the angle of the light bundles 39, 39' as well as the common location can be determined for uniform deflection. This is advantageous because at very low numbers $m_z$ or $m_\rho$, the limits of mechanical feasibility are very quickly reached, as will be shown especially by the numerical examples given hereinafter.

Further, this additional optical system 55 can be used in all of the following examples, However, for the sake of simplicity, a fuller explanation of the manner of operation with optical system 55 is omitted for these examples. However, with the aid of principles of geometric optics, the person skilled in the art will always be able to improve and modify the following examples with additional optical systems 55. Similarly, all of the other remarks made above with respect to the position of the common location 54 can also be referred to all other examples.

Figure 5:
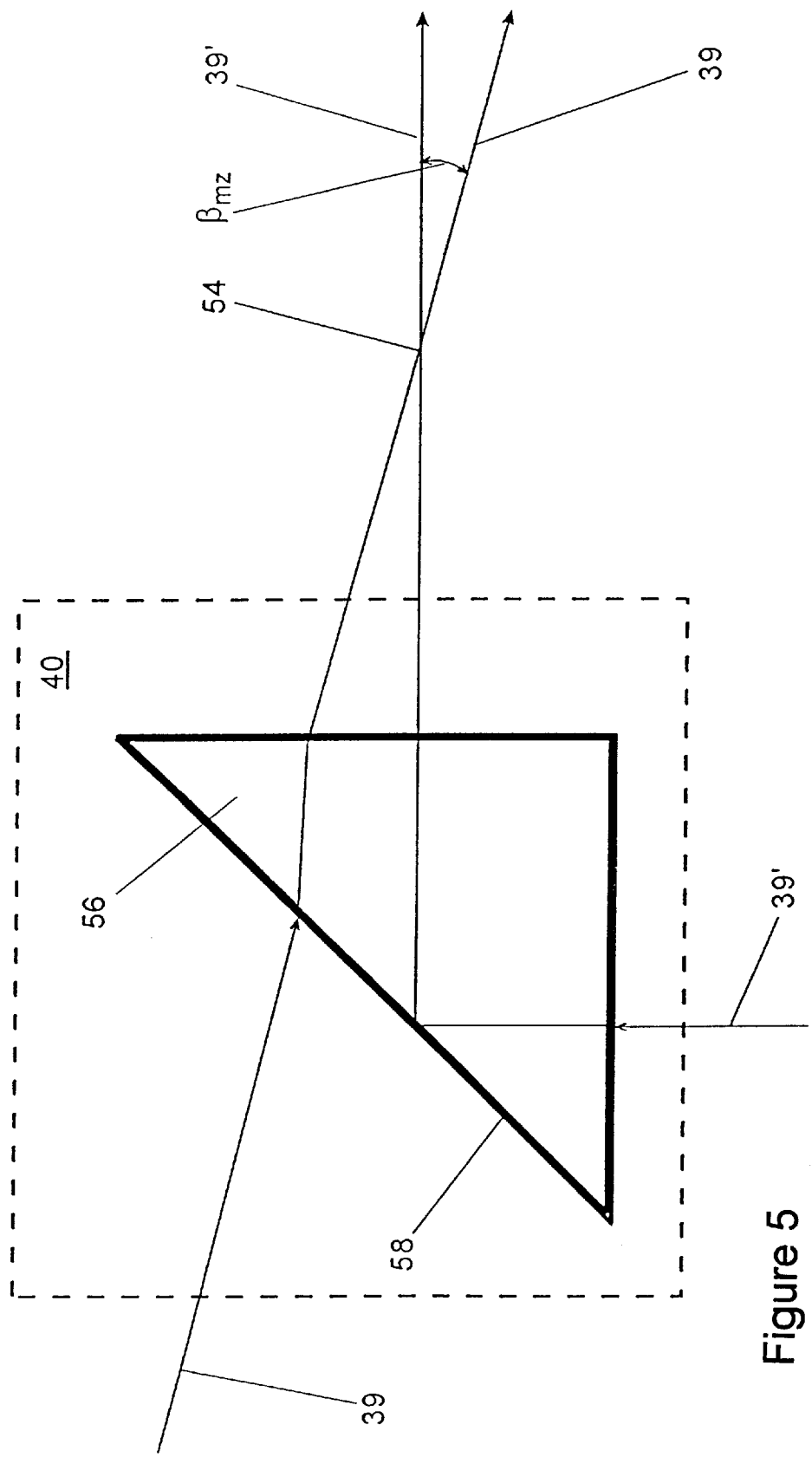
FIGS. 5 to 8 show optical systems other than that in FIG. 4 for use in the device in FIG. 1.

FIG. 5 shows another embodiment example for an optical system 40 in which neither birefringent material not different polarization directions for the light bundles 39 and 39' need be provided. The optical system 40 comprises a prism 56 in which the light bundle 39' enters at an angle at which it is totally reflected at a surface 58 of the prism 56. On the other hand, light bundle 39 impinges on this prism face 58 and is refracted in the prism 56, resulting in a defined angle between the incident light bundles 39 and 39'. The light bundles 39 and 39' unite at the above-mentioned point 54 and then split apart at the same angle, wherein this angle, as was already mentioned, is fixed by the line number $m_z$ and is determined by the configuration of geometric conditions and the angle of the prism 56 itself.

Figure 6:
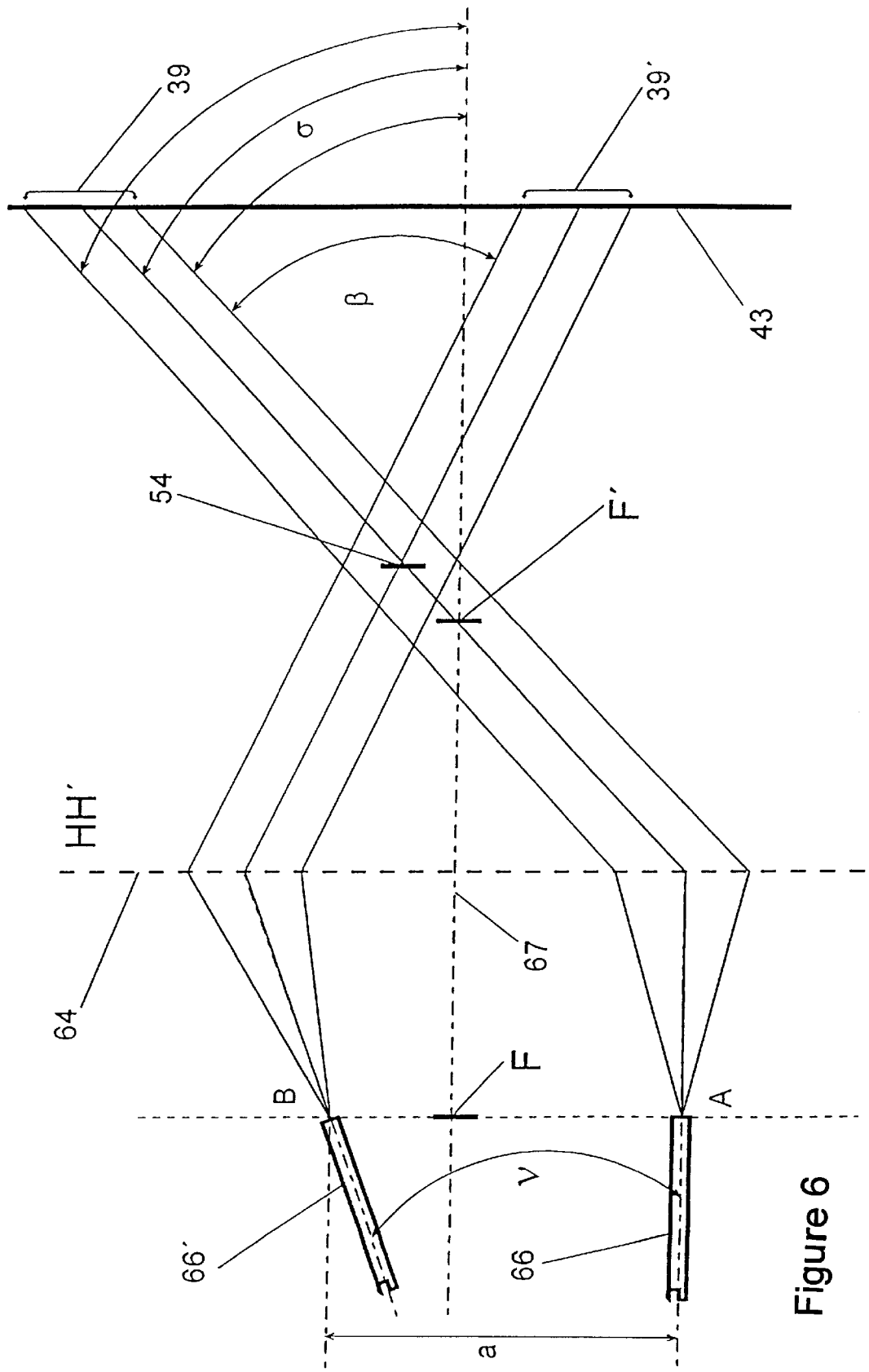

FIG. 6 shows fundamental imaging relationships for the combining of light bundles 39, 39' which exit from source points A and B, wherein angle β and location 54 are determined by a focussing optical system 64 characterized by a principal plane HH'. In the example shown in FIG. 6, the source points A and B are formed, by way of example, by the light exit areas of light-conducting fibers 66 and 66'. The source points A and B are situated asymmetrically relative to the optical axis 67 of the optical system 64 and in the object-side focal plane F of the imaging optics 64. All of the light bundles proceeding from the respective source point A, B which enter the optical system 64 exit at the same angle σ to the optical axis 67 of the imaging system. The distance between source points A and B determines the angle β.

On the other hand, the direction of the principal beams, that is, the orientations of the light-conducting fibers 66 and 66' in the example with reference to the optical axis of the imaging optics 64 fixes the position of the common point 54. The angle v in the example of FIG. 6 between the fiber cores is selected in such a way that the two light bundles 39 and 39' travel apart in front of the imaging optics. The imaging optics 64 then combine the light bundles at the common point 54 which lies behind the image-side focal point F' and at a distance from the optical axis 67 in the example.

As can be seen, the location of the common point 54 can be varied by inclining one or both fiber cores at the end of the fiber within certain limits between the principal planes HH' of the imaging optics 64 and the screen 43. An angle of less than 30° to the optical axis has proven particularly advantageous for optical systems that were realized in practice.

These considerations apply for the simultaneous display of more than one line of an image ($m_z \neq 0$) in the vertical arrangement of the source points as well as for the display of more than one image point ($m_\rho \neq 0$) in a line in the horizontal arrangement of the source points.

Figure 7:
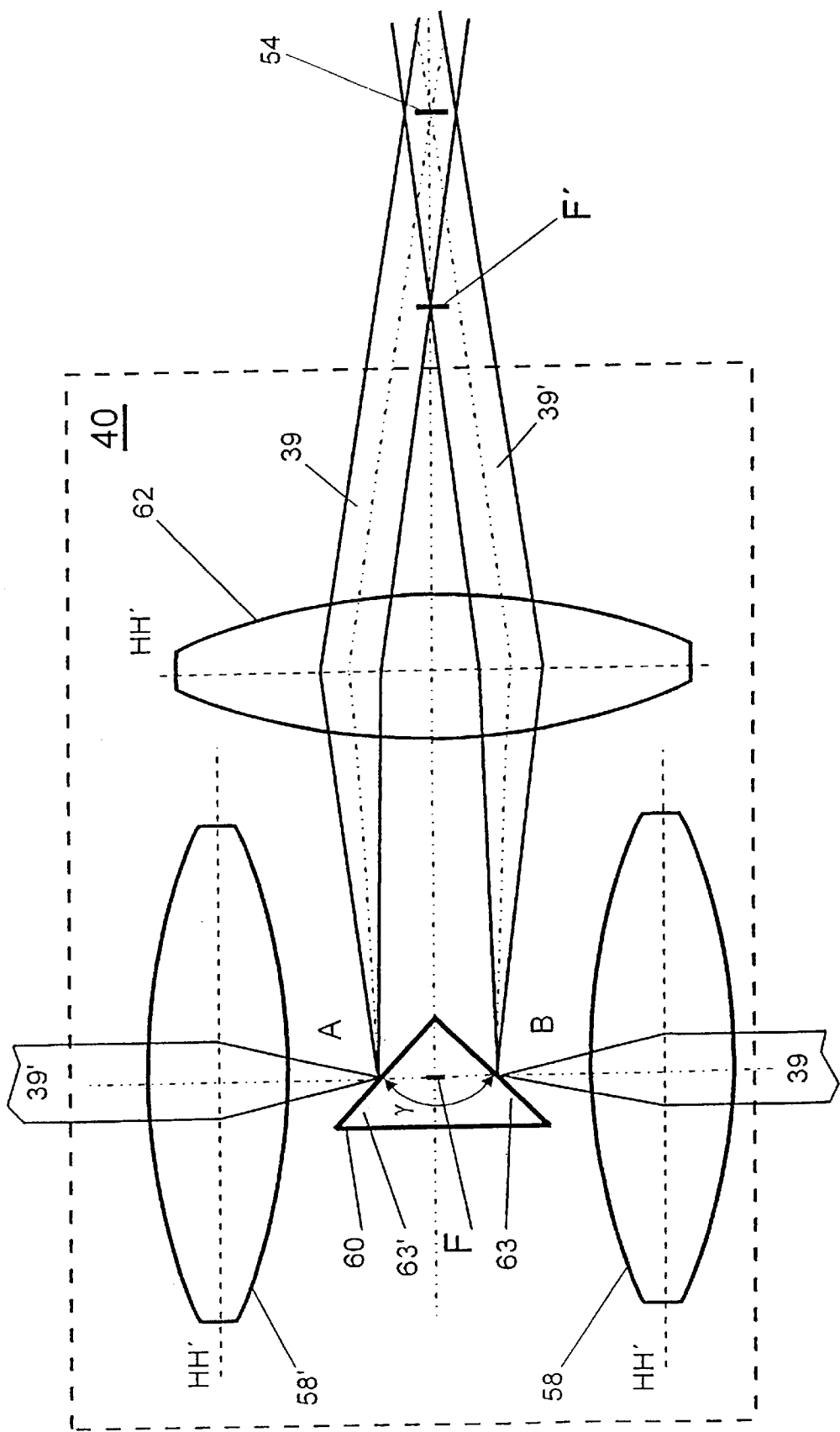

FIG. 7 further shows an embodiment example for the optical arrangement 40 which uses lenses as well as mirrors. In the arrangement of the embodiment example in FIG. 7, it was taken into account in particular that each of the incident parallel beams 39 and 39' is parallel again after exiting the optical system.

In this embodiment example, the light bundles 39 and 39' are focussed on a mirror 60 by lenses 58 and 58', so that the source points A and B mentioned above are generated on the surface of the mirror 60. After being reflected by means of another lens 62, the light bundles are then parallelized as was already discussed with reference to FIG. 6.

The image-side focal points of the lenses 58 and 58' consequently lie on the reflecting mirror surface and, further, in the focal plane of the lens 62 so that the emerging light bundles 39 and 39' are again made parallel.

The manner in which the light bundles are combined is essentially determined by the shape of the mirror 60 which, in the embodiment example in FIG. 7, comprises two partial mirror surfaces 63 and 63' which join at a right angle γ in the embodiment example, wherein light bundle 39 is reflected by partial surface 63 and light bundle 39' is reflected by partial surface 63'.

The angle of the emerging light bundles 39' and 39 and the position of the point 54 which is generated by the lens 62 and which is traversed by both light bundles 39 and 39' jointly can be changed, for example, by the selection of the focal length of the lenses 58, 58' and 62. It is further possible to determine the angle between the light bundles 39' and 39 and the position of the common point 54 through the position of the mirror 60 and of the angle γ between the mirror surfaces 62 and 62'. The person skilled in the art will be familiar with the consequences of such changes from the laws of geometric optics and these consequences will be better understood by the remarks pertaining to the views in FIGS. 4 to 6.

Figure 8:
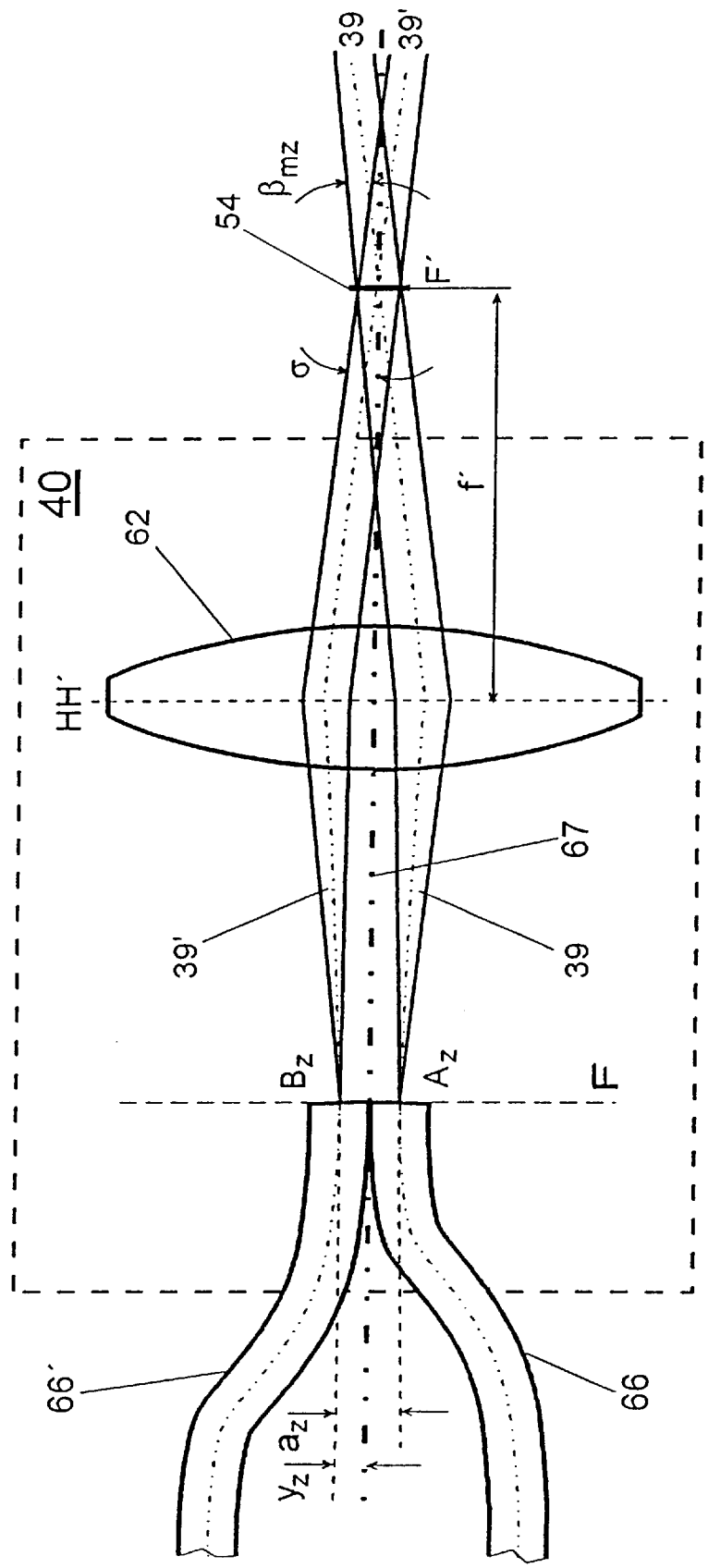

FIG. 8 shows another embodiment example of the optical system 40 in which the source points A, B are again the exit areas of the cores of two light-conducting fibers 66 and 66'. The embodiment example has a focussing device, lens 62, wherein the exit areas of two light-conducting fibers 66 and 66' are arranged in the input-side focal plane of the lens 62 and form the source points $A_z$ and $B_z$. Source point $A_z$ provides light bundle 39 and source point $B_z$ provides light bundle 39'. The respective core of the light-conducting fibers 66 and 66' in which the light bundles 39 and 39' are guided is indicated by the dashed line.

According to FIG. 8, the central axes of the fiber cores of the light-conducting fibers 66 and 66' extend parallel to one another ($v_z=0°$) at a distance $a_z$ and at the same distance $y_z$, respectively, from the optical axis 67. The ends of the fibers are located in the object-side focal plane F. The principal beams of the image points $A_z$ and $B_z$ intersect in the image-side principal focus or focal point F' at a distance f' from the principal planes of the lens 64 and form the common point 54.

The angle of these beams and of all of the other beams proceeding from the source points $A_z$ and $B_z$ with respect to the optical axis 67 is always equal to σ. The angle of 2σ corresponds to the angle $\beta_{mz}$ between two lines which are written during the image scanning at a distance of $m_z$ lines. The magnitude of the required angles and the selected value of $m_z$ will now be discussed more fully:

For case 1 described above, the distance between the source points $A_z$ and $B_z$ is as follows:

| | |
|---|---|
| $m_z = 1$ | $a_{1z} = 6\ \mu m$ |
| $m_z = 3$ | $a_{3z} = 17\ \mu m$ |
| $m_z = 5$ | $a_{5z} = 28\ \mu m$ |
| $m_z = 7$ | $a_{7z} = 40\ \mu m$ |
| $m_z = 9$ | $a_{9z} = 51\ \mu m$, and so on. |

The following lines are scanned jointly in succession, for example, at $m_z=9$:

1st line and 10th line
3rd line and 12th line
5th line and 14th line
7th line and 16th line
9th line and 18th line
11th line and 20th line, and so on.

In practice, up to an area at the start of the image and at the end of the image, an image is written with twice the line number and each line is written only once. It will be described hereinafter how lines 2, 4, 6 and 8 which cannot be shown initially are imaged on the screen.

In case 2, described above, the following is given for the distance between source points $A_z$ and $B_z$:

| | |
|---|---|
| $m_z = 2$ | $a_{2z} = 11\ \mu m$ |
| $m_z = 4$ | $a_{4z} = 23\ \mu m$ |
| $m_z = 6$ | $a_{6z} = 34\ \mu m$ |
| $m_z = 8$ | $a_{8z} = 45\ \mu m$ |
| $m_z = 10$ | $a_{10z} = 57\ \mu m$, and so on. |

The following lines are scanned jointly in succession, for example, at $m_z=10$:

1st line and 11th line
2nd line and 12th line
3rd line and 13th line
4th line and 14th line
5th line and 15th line
6th line and 16th line
7th line and 17th line
8th line and 18th line
9th line and 19th line
10th line and 20th line
11th line and 21st line, and so on.

After line 10, the following lines are always written twice, specifically at different time points, until reaching an area at the end of the image.

It will likewise be described hereinafter how lines 1, 2, 3, 4, 5, 6, 7, 8, 9 and 10, which initially cannot be written twice, are again imaged on the screen.

Some numerical examples will be given with reference to the embodiment example in FIG. 8 in order to illustrate more fully the dimensioning of the optical system 40 in a video system.

A focal length of 1 to 7 cm has proven advantageous in practice for the lens 62 shown in FIG. 8 when used in the device according to FIG. 1 and makes it possible to meet a number of boundary conditions for the dimensioning of a video system in a simple manner. In particular, a lens 62 with a focal length of 2.5 cm was used for the embodiment example in FIG. 1 based on the characteristics of the utilized waveguides.

The image mirror 42 (swivel mirror) can be swiveled by $\alpha_z=15°$ in the embodiment example for scanning $N_z$ lines. From this magnitude and from a line number $N_z$ of 1152, an angle of $\beta_{1z}=0.013°$ between the two adjacent lines can be calculated for the line difference of the synchronously scanned light bundles with the line spacing number $m_z=1$. At the above-mentioned focal length of 2.5 cm, this requires a distance of 6 $\mu m$ between the cores of the light-conducting fibers 66 and 66' for the adjustment of the desired angle. This distance is very small compared with the diameter of conventional light-conducting fibers 66 and 66' and can hardly be realized in practice, especially when a fiber with a core diameter of approximately 6 $\mu m$ is used. With smaller core diameters, crosstalk between the light-conducting fibers due to leakage field coupling (evanescent field coupling) impedes the divided light propagation of the light bundles 39 and 39' before reaching the screen.

This set of problems can be circumvented when the selected line spacing number $m_z$ is greater than 1. For example, at $m_z=5$, lines 1, 3, 5, 7 can be simultaneously scanned by light bundle 39 and lines 6, 8, 10, 12 can be simultaneously scanned by light bundle 39'. In that case, the distance between the cores of the light-conducting fibers 66 and 66' will be approximately 28 $\mu m$.

With a number larger than $m_z=5$, this distance increases. When $m_z=576$ and N=1152, the top half of an image could even be scanned by light bundle 39 and the bottom half by light bundle 39'. However, in that case, the common point 54 should lie on the deflecting facet of the line mirror 41 constructed as a polygon mirror so that the light bundles 39, 39' are united on the mirror surface and small mirror dimensions can be maintained. This can be achieved in the embodiment example according to FIG. 8 in that the principal beams of the source points $A_z$ and $B_z$ lie parallel to the optical axis 67, wherein these principal beams form the common point 54 in the image-side focal point F' and the facet of the polygon mirror likewise lies in the image-side focal point F'.

In the embodiment example shown in FIG. 1, the selected value of $m_z$ was always small for different tests, so that it was possible to dispense with an additional lens system 55 according to FIG. 3. Further, the light bundle 39 was constantly scanned with respect to odd line numbers 1, 3, 5, 7 . . . . Further, $m_z$ was also selected as an odd number so as to ensure that light bundle 39' scans only even lines and no individual line of the video image is scanned by both light bundles 39 and 39', so that a double illumination of individual lines by different light bundles 39, 39' could be excluded while economizing on controlling means.

As was already mentioned, in the case of a small number $m_z$ the cores of the light-conducting fibers 66 and 66' advisably approximate the micrometer range. For this purpose, the cladding of the light-conducting fibers 66 and 66' was ground until close to the core before joining and the light-conducting fibers were then joined at the ground surfaces by gluing.

However, when the distance between the cores is very small in the micrometer range, an unwanted effect can occur. Because of the wavelengths diverging from zero, the wave is not completely guided in the core of a light-conducting fiber; rather, an exponentially decreasing leakage field occurs in the cladding which tends to cause an excitation of modes in the core of the other respective light-conducting fiber 66' or 66, for example, when the light-conducting fibers 66 and 66' are too close, so that a complete separation of the light bundles 39' and 39 could not be expected. In order to reduce this effect, the selected distance between the cores of the light-conducting fibers 66 and 66' would have to be substantially greater than 10 $\mu m$ or even 30 $\mu m$, since cores of this kind can even have diameters in the order of magnitude of 10 $\mu m$. This requirement can be met, for example, by a suitable selection of the number $m_z$ which substantially contributes to the determination of the required angle between the light bundles 39 and 39'. With numbers $m_z$ greater than 1, additional lines occur depending on the selection of the number $m_z$, which additional lines were blanked during modulation in the embodiment example.

As a result of the method described thus far, a portion of the lines is not written at the start of the image and at the end of the image. Depending on the magnitude of the line spacing number $m_z$ that is selected, lines result which cannot initially be displayed.

For example, the following relationships are given at the start of the image in the case of an odd line spacing number $m_z$ (case 1):

| | |
|---|---|
| $m_z = 1$ | every line is written |
| $m_z = 3$ | 2nd line is not written |
| $m_z = 5$ | 2nd and 4th lines are not written |
| $m_z = 7$ | 2nd, 4th and 6th lines are not written |
| generally | $(m_z-1)/2$ lines with even line number are not written. |

In this case, the following lines are not written at the end of the image in the example (case 1):

| | |
|---|---|
| $m_z = 1$ | every line is written |
| $m_z = 3$ | 1151st line is not written |
| $m_z = 5$ | 1149th and 1151st lines are not written |
| $m_z = 7$ | 1147th, 1149th and 1151st lines are not written |
| generally | $(m_z-1)/2$ lines with odd line number are not written. |

According to the results shown above, $(m_z-1)/2$ lines at the top edge of the image and $(m_z-1)/2$ lines at the bottom edge of the image are not displayed. Thus, when $m_z=11$, roughly 0.5% of the image information in the horizontal edge regions is omitted.

These losses are not perceived by an observer in most applications.

According to another possibility, the image dead time or idle time of 1.6 ms which was given in all of the video standards (PAL, HDTV) described above is used for pre-writing and after-writing, respectively, the starting lines and the ending lines which could not previously be displayed because in the video projection system described in the beginning, the galvanometer mirror requires a reset time of about 1 ms. The remaining image idle time of 0.6 ms is then available for writing lines at the start of the image and at the end of the image. In practice, image displays with a line spacing number of about $m_z<20$ can be realized in this way without information loss. However, the line spacing number can also be further increased when the image mirror 42 is controlled in such a way that an image is always scanned from top to bottom and the next is scanned from the bottom to the top. In this case, the reset time is dispensed with and the entire interval of 1.6 ms is available for after-writing lines.

With a line spacing number of $m_z=10$, the following mode results according to case 1 at the start of the image:

first, lines 2, 4, 6, 8 are written successively only proceeding from source point A. This is effected within 4·32 $\mu$s=0.128 ms in the range of the actual image idle time, source point B is dark, light bundle 39' then writes the temporarily stored line 1 from source point B and the light bundle 39 simultaneously writes line 10 proceeding from source point A. In the same way, lines 3 and 12, 5 and 14, 7 and 16, etc. are displayed simultaneously by pairs.

and at the end of the image:

proceeding from source point B, line 1143 and, proceeding from source point A, the last line 1152 are displayed simultaneously, in the image idle time, light bundle 39 writes lines 1145, 1147, 1149 and 1151 successively proceeding from source point B. This is effected within 4·32 $\mu$s=0.128 ms in the range of the actual image idle time, source point A is dark, i.e., light bundle 39 is blanked.

Therefore, in the example, only 0.256 ms are required to display the lines at the start and at the end of the image (remaining image idle time 0.344 ms).

However, if it is desirable to omit controls and keep $m_z$ small, the leakage field mentioned above should be reduced. This is possible in that a reflecting aluminum film 70 is vacuum-deposited, for example, between the light-conducting fibers 66 and 66' just before their junction. This short-circuits the electric field strength of the leakage fields and reflects the leakage fields back into the core in the visible wavelength range. However, in certain situations, this entails considerable light loss which should be reduced by suitable steps such as by forming a taper at the end of the fiber.

However, waveguides with large refractive index gradients likewise reduce the propagation of the leakage fields so that the wave-conducting regions can be brought relatively close together in this case. This also makes possible constructions in which the light bundle 39 scans lines 1, 3, 5, 7 . . . and light bundle 39' scans lines 2, 4, 6, 8 . . . synchronously therewith. The line spacing number $m_z$ in this case is 1 and the waveguides should be spaced at a distance of less than or approximately 6 $\mu$m.

Another embodiment example with integrated light guides is shown in the following with reference to FIGS. 9 and 10. For this purpose, FIG. 10 first shows a schematic view of an integrated light guide coupler which can be used as a joining device 38 in the embodiment example shown in FIG. 1. The method of realizing such light-conducting couplers is shown in detail in German Patent Applications 195 03 930 and 195 03 931.

For this purpose, a wave-conducting structure 74 by which the three light bundles of different wavelength 12, 22, 32 are combined to form a common light bundle 39 after modulation is formed in a substrate 72 suitable for integrated optics. The structure 74 was produced for this purpose by suitable doping of the substrate 72.

An optical arrangement 40 shown in FIG. 110 is formed by placing the doped surfaces of two such light-conducting couplers in contact with one another, wherein one surface generates light bundle 39 and the other surface generates light bundle 39'. The outputs of the structures 74 and 74' were placed one upon the other resulting in an optical system similar to that shown in FIG. 7 in which the light bundles 39 and 39' emerge from the light guides at a small distance from one another. The distance defined for determining the angle can be precisely determined, for example, by sputtering a film 70 of defined thickness made, for example, from polysilicon, on the doped surfaces of the substrates 72 and 72' before joining the light-conducting fiber couplers.

With very small distances, however, leakage field coupling must again be taken into account in this case, so that an additional film of aluminum was also vacuum-deposited on the substrates 72 and 72' before joining, thus short-circuiting the leakage fields, as was described.

As in FIG. 6, the exit areas of the structures 74 and 74' for the emergence of light bundles 39 and 39', i.e., the source points A and B, are again situated in the focal plane of a lens 64. In this respect, the same decisive considerations as those in the embodiment example shown in FIG. 6 and FIG. 8 apply in this case.

The preceding remarks referred to the example of two light bundles 39 and 39'. The principles introduced in this connection are, of course, also valid for more than two source points $A_z$ and $B_z$, so that in the case of a fourfold arrangement, for example, four lines can be displayed simultaneously in parallel.

Further, in the comments made above with reference to the embodiment examples, the source points A and B lie in a plane which, however, advisably contains the optical axis 67 and their surface normal faces in the line deflecting direction. Further, the source points are advisably at the same respective distance from the optical axis. In this way, two or more lines can be written in parallel in a particularly simple manner.

The application, already mentioned, of the procedure shown up to this point to the image points of a line leads to a somewhat different arrangement in which the source points $A_\rho$ and $B_\rho$ are positioned in a plane which contains the optical axis 67 and whose normal is vertical to the line direction.

In this case, the statements made above also apply in a fully analogous manner to the image points of a line. Two or more image points of a line can be written simultaneously with the source points $A_\rho$ and $B_\rho$ when the modulators of the light sources 14, 24, 34 are controlled in accordance with the light sources 44 and 44' and the line mirror 41 and image mirror 42 are correspondingly designed. An arrangement of this kind serves in particular for output scaling.

Further, a multiplication of the quantity of image points in a line can also be achieved with this arrangement. This is particularly advantageous for digital raster scanning of the image points of a line or when using a light source that is pulsed synchronously for the display of the image points. Further, it is possible to increase the number of image points $N_\rho$ within a line in that image points 1 to 576 are written with one light bundle 39 and image points 577 to 1152 are written with the second light bundle 39'.

Further, a combination of 4 source points arranged in a rectangle in the focal plane 64 of the lens is advantageous, wherein two light bundles write the two image points in a line and two additional light bundles which are offset in the line direction proceed from these source points, so that every image point receives its image information that is required at a point in time by means of a corresponding controlling of the modulators of the four associated light sources 44. Accordingly, two image points of different intensity and color can be written simultaneously in at least two lines, respectively. However, four intensity-modulated and color-modulated light sources 44 are required for this purpose, which are controlled by the electronic control unit 46 (see FIG. 1).

In this variant for simultaneously scanning more than one line of the image and more than one image point in every line, there exists a further possibility in that the common point 54 for the source points $A_z$ and $B_z$ associated with different lines can be located at a different location on the optical axis 67 compared with the common point 54 for source points $A_\rho$ and $B_\rho$ associated with different image points by means of a suitable selection of the directions of the light bundles proceeding from the source points, as was mentioned with reference to FIG. 5.

Accordingly, it is possible, for example, through the selection of the angles $v_z$ and $v_\rho$, to situate the common point 54 for the source points $A_z$ and $B_z$ on the image mirror 42 and to locate the common point 54 for source points $A_\rho$ and $B_\rho$ on the line mirror 41.

Figure 11:
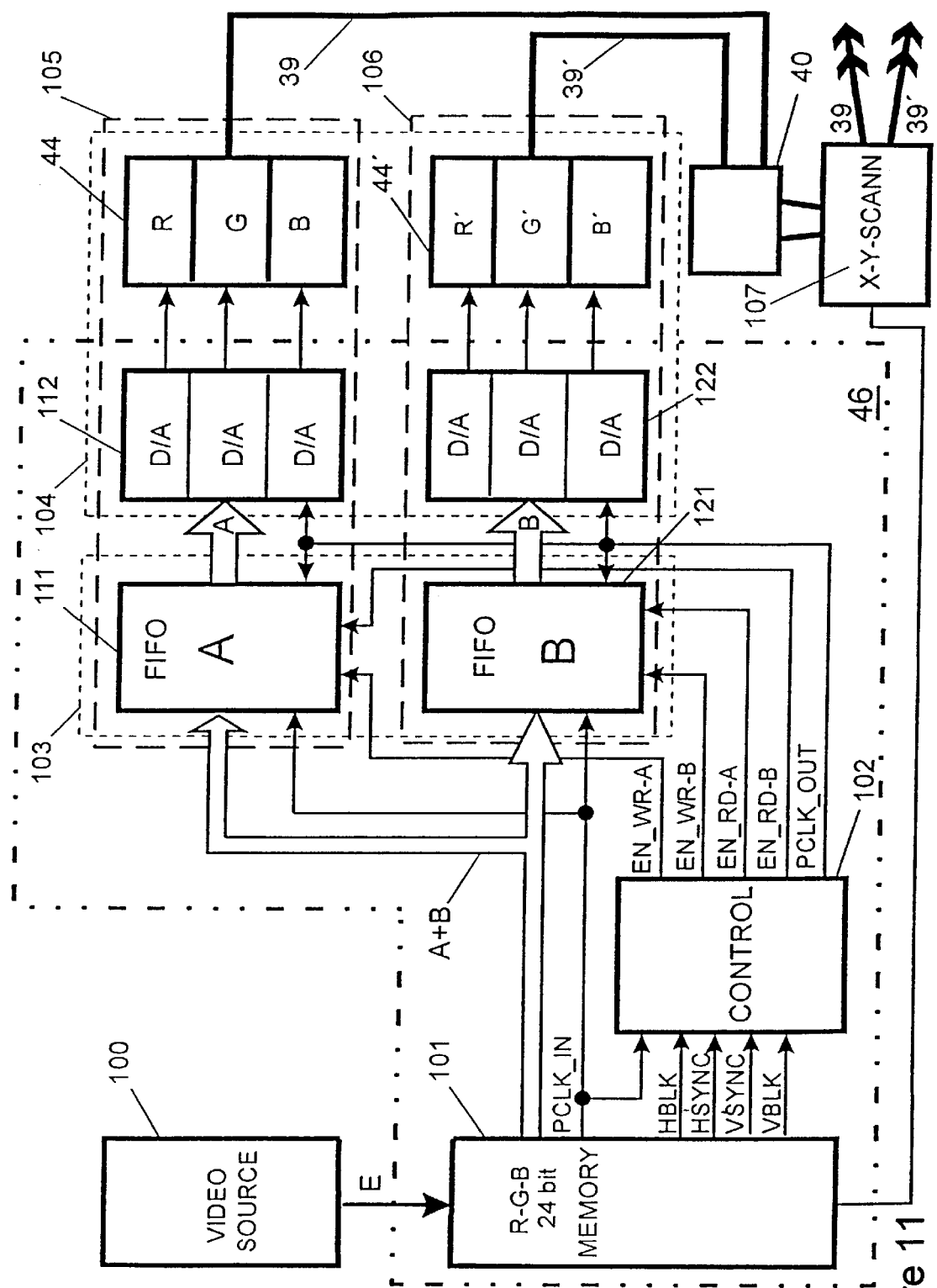
FIG. 11 shows a circuit for controlling the device shown in FIG. 1.

FIG. 11 shows a circuit arrangement for the simultaneous readout of two video lines of a video image by means of light bundles 39 and 39' which are generated by the video data stream E from an optional video source 100.

The video data stream E which is stored sequentially in a buffer storage 101 so as to be ordered with respect to image points and lines is divided by means of a control circuit 102, in accordance with the quantity of readout channels, and therefore in accordance with the quantity of lines to be displayed simultaneously by the at least two light bundles 39, 39', into the output channels 105 (A) and 106 (B), shown here by way of example.

The intermediate storages 111 and 121 in each of the readout channels 105 and 106, receive the video data, i.e., digital values for the subsequent digital-to-analog conversion for controlling the modulators of the light sources 44 and 44', from the control circuit 102 in words 24-bit length.

The intermediate storage 111, FIFO A (FIFO=first in, first out). contains the RGB data A allocated to readout channel 105 and intermediate storage 121, FIFO B, contains the RGB data B allocated to readout channel 106.

The temporal flow of outgoing RGB data A and B is decoupled from the incoming video data stream E in a video projection system which is operated asynchronously relative to the incoming video signal. However, the readout of the RGB data A and B allocated to the respective readout channel 105 and 106 is carried out at the same time, wherein the desired line offset $m_z$ given by the control device 102 is taken into account.

For this purpose, the video data A+B is read out from the buffer storage 101 in dependence on a time clock given by the deflecting device 107 in asynchronous operation. The readout of the RGB data A and B is carried out in the fixed relationship which is given by $m_z$ and which is determined by the organization of the intermediate storages 111 and 121. With the latter, it is further possible in connection with methods for processing a video image (see DE 195 17 357 C1) to display video data E in different video standards with a given configuration of light modulators and light deflecting devices.

It is further possible to control the RGB data A+B and the deflecting device 107 synchronously with the video data stream E of the video source. In this case, the buffer storage 101 can be dispensed with, which reduces complexity.

However, an intermediate storage of individual lines by means of the intermediate storages 111 and 121 is advisable in order to ensure a continuous, high-quality image display with more than one scanning light bundle. Known FIFO storages with a suitable memory length were selected as intermediate storage 111 by reason of their simple control. For HDTV, the required memory length per line was, for example, 1,440 image points multiplied by 24 bits=34,560 bits.

In the following, the example in which the line spacing number $m_z=3$ is described more fully for case 1. Lines 1 and 3 must first be stored in the intermediate storage 111 which is provided only for odd line numbers.

During this time period, initially only the video information for line 2 is read out from the readout channel 106 for modulating the light bundle 39'. A simultaneous readout of video data A for the 1st line and of video data B for the 4th line is carried out, controlled by the signal PCLK_OUT, at the respective three digital-to-analog converters 112 and 122 of each readout channel 105 and 106 only when the video information for line 4 is available for readout in the intermediate storage 121. A RGB light source 44 and 44' is connected to the digital-to-analog converters in every readout channel, wherein these RGB light sources 44 and 44' have, in turn, three modulators 14, 24 and 34 in accordance with the example in FIG. 1. The intensity-modulated and color-modulated light bundles 39 and 39' are combined in the optical arrangement 40 and guided to a deflecting device 107 which, in the example according to FIG. 1, has a line mirror 41 for deflection in the x-direction and an image mirror 42 for deflection in the y-direction. The readout of the 1st and 4th lines is followed by the readout of the 3rd and 6th lines, 5th and 8th lines, etc.

In the present case, the memory length of the intermediate storage 111 in the readout channel 105 is accordingly 2 lines, generally, in the raster scanning method described herein, $m_z-1$ lines. The memory length for intermediate storage 121 in readout channel 105 is further oriented to 1 line, generally $m_z-2$ lines.

As a result of the simultaneous readout of a plurality of lines, there is a line frequency which is reduced in proportion to the quantity of simultaneously read out lines and which corresponds to signal HSYNC and an image point frequency according to signal PCLK per channel.

In the case of two simultaneously scanned lines, the required scanning frequency and the modulating frequency for display in accordance with a video standard are halved. In a system with a given scanning frequency, the quantity of lines that can be displayed on the screen per unit of time is consequently doubled.

The circuit further contains the control circuit 102 for allocating the RGB data A and B in the respective intermediate storages 111 and 121 and the control of the intermediate storage and digital-to-analog converter 112 and 122.

The sequentially arriving RGB data A and B are read into the two intermediate storages 111 and 121 line by line by means of the control circuit 102. The enable signals EN_WR-A and EN_WR-B and the image point clock signal PCLK_IN serve for control.

This part of the control circuit works like a multiplexing control which fills the intermediate storages 111 and 121 with the RGB data A or B of a line, as required.

The readout of the two intermediate storages 111 and 121 is carried out simultaneous with the reading signals EN_RD-A and EN_RD-B and the signal clock PCLK_OUT as soon as the RGB data A and B are simultaneously available at the outputs of the two intermediate storages 111 and 121.

Figure 12:
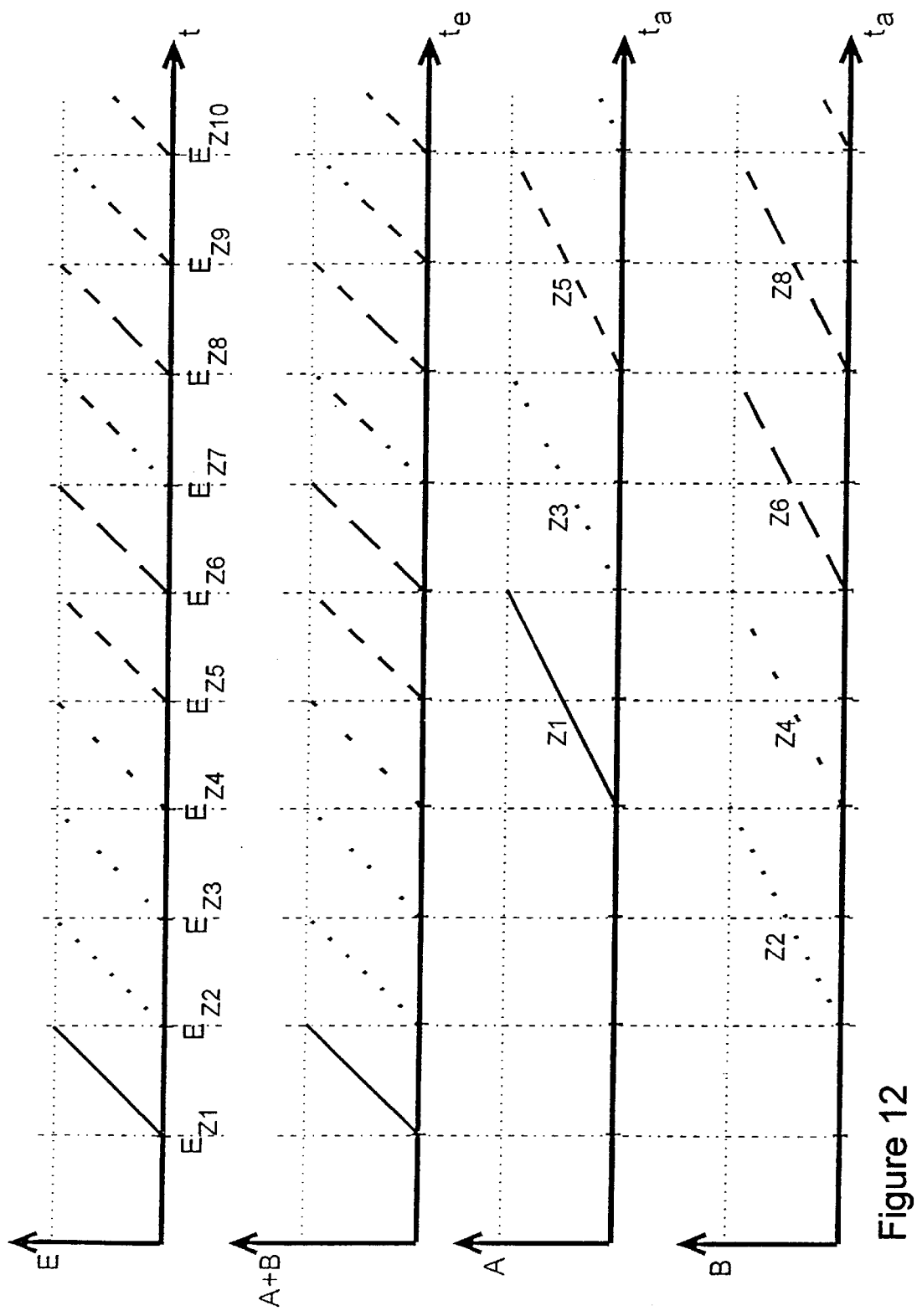
FIG. 12 shows a plurality of signal waveforms for describing the circuit shown in FIG. 11.

FIG. 12 shows the flow of video data information E for purposes of illustration. Also shown is the flow of RGB data A+B, A and B. The RGB data A and B are buffered in the intermediate storages 111 and 121 and simultaneously read out. As can be seen in FIG. 11, a fixed temporal relationship exists between RGB data A+B and RGB data A and B. On the other hand, the fixed relationship shown between the video data E and the RGB data A and B exists only in synchronous operation of the video projection system, but not always with asynchronous operation. However, in the interest of a high-quality image display, the selected time ranges in the case of asynchronous operation are sufficiently long to practically rule out the loss of image information.

The control mentioned above is only an example for illustrating how the signals can be generated for modulating different light bundles. The invention can also be realized with different controls, for example, by direct multiplexing of the output of an individual image storage for intermediate storage of a video image.

Regardless of the manner of operation of the electrical control, the device according to invention enables an increased output and improved quality of video images with the two light bundles indicated by way of example for separate scanning of lines and image points in a line. The advantages achieved in this way are used more effectively when more than two light bundles are used. Further, the invention is not limited to the lasers indicated by way of example. Only the high degree of parallelism of the light bundles is important for the constructions shown above, although this parallelism is best realized by lasers in the present state of the art.

While the foregoing description and drawings represent the present invention, it will be obvious to those skilled in the art that various changes may be made therein without departing from the true spirit and scope of the present invention.

What is claimed is:

1. A device for displaying a video image comprising:

a source emitting at least an intensity-modulated light bundle;

a deflecting device for deflecting the light bundle, as well as for the angle-proportional scanning of $N_p$ image points in lines over an angle $\alpha_p$, and for the angle-proportional scanning of the light bundle of $N_z$ lines of the video image over an angle $\alpha_z$;

said source emitting two light bundles which can be modulated independently from one another, the first light bundle being modulated with the video information for the illumination of a first image point controlled by raster scanning and the second light bundle being modulated with the video information for the illumination of a second image point;

wherein the video information of the second image point is offset relative to the video information of the first image point by $m_z$ lines of an image and $m_p$ image points of a line with whole numbers $m_z \leq N_z$ and $m_p \leq N_p$, and $m_z$ and/or $m_p \neq 0$; and an optical system being provided which combines the two light bundles at a common real or virtual point situated in front of or inside the deflecting devices in the direction of light propagation, the two light bundles traveling apart proceeding from this real or virtual point at a predetermined angle $m_z \times \alpha_z / N_z$ in the image scanning direction and at a predetermined angle $m_p \times \alpha_p / N_p$ in the line scanning direction.

2. The device according to claim 1, wherein an image storage from which the respective lines for the first light bundle and second light bundle can be read out synchronously, and a control device for controlling the sources and/or the deflecting device in order to scan every line of the video image exclusively in each instance by means of one of the two light bundles.

3. The device according to claim 1, wherein $m_z$ does not equal 0, and the first light bundle is guided only over odd line numbers or only over even line numbers and the number $m_z$ is odd.

4. The device according to claim 1, wherein the first light bundle is guided over consecutive line numbers and image point numbers for raster scanning a complete image.

5. The device according to claim 1, wherein the deflecting device has a polygon mirror for scanning $N_p$ image points in the line direction and the common point of the light bundles lies on the respective deflecting facet of the polygon mirror.

6. The device according to claim 1, wherein the deflecting device has a swivel mirror for the raster scanning of $N_z$ lines of the video image, and the common point lies on the surface of the swivel mirror.

7. The device according to claim 1, wherein a light guide is provided for each light bundle, the light bundle being introduced into the light guide proceeding from the source, in that the ends of the light guides on the output side are fixed at a distance, and in that a focussing device is provided following the light guide on the output side, wherein the outputs of the light-conducting fibers lie in the input-side focal plane of the focussing device so that the light from the respective light guide is parallelized on the one hand and the two light bundles are combined in a point while forming the predetermined angles $\alpha_\rho$ and $\alpha_z$ on the other hand.

8. The device according to claim 7, wherein at least one light guide is arranged on-the output side at an angle to the optical axis of less than 30° and, in particular, less than 1°.

9. The device according to claim 7, wherein the light guides are provided in an integrated optical component.

10. The device according to claim 7, wherein the distance between the outputs of the light guides is greater than 10 $\mu$m and less than 1 mm.

11. The device according to claim 10, wherein the distance between the outputs of the light guides is greater than 30 $\mu$m.

12. The device according to claim 7, wherein the light guides are light-conducting fibers having a core and cladding which are joined on the output side, wherein the cladding of each light-conducting fiber is flattened at the location where they are joined, so that the cores of the two light-conducting fibers are at a small distance of greater than 10 $\mu$m on the output side.

13. The device according to claim 1, wherein the deflecting device has a mirror which is movable in two directions, both light bundles being united on the surface of this mirror at the common point at the predetermined angle, proceeding from which point the light bundles are then reflected, and in that a drive is provided for spiral movement of the movable mirror, wherein the lines for quantity $m_z$ are counted in radial direction and the image points for quantity $m_\rho$ are counted in the progressing direction of the spiral scanned in this manner.

14. The device according to claim 1, wherein the source emits four light bundles which can be modulated independently from one another, two of which light bundles write different image points at an angle $\alpha_\rho$ of a first line of an image, and the two other light bundles write different image points at an angle $\alpha_\rho$ in a second line which is offset relative to the first line by $m_z$ lines.

15. The device according to claim 14, wherein the source points of the light bundles considered in the direction of light are arranged rectangularly on a focal plane of an optical device.

16. A production process for a device for displaying a video image, for which a source emitting at least an intensity-modulated light bundle and a deflecting device for angle-proportional scanning of $N_p$ image points in lines over an angle $\alpha_\rho$ and for angle-proportional scanning of $N_z$ lines of the video image over an angle $\alpha_z$ of the light bundle are provided, comprising the steps of:

designing the source for the emission of two light bundles which can be modulated independent from one another, the first of which light bundles being modulated with the video information for the illumination of a first image point controlled by raster scanning and the second light bundle being modulated with the video information for the illumination of a second image point;

offsetting the video information of the second image point relative to that of the first image point by $m_z$ lines of a picture and $m_\rho$ image points in a line, with whole numbers $m_z \leq N_z$ and $m_\rho \leq N_\rho$, and $m_z$ and/or $m_\rho \neq 0$;

providing an optical system which combines the two light bundles at a common real or virtual point situated in front of or inside the deflecting device in the direction of light propagation, proceeding from which real or virtual point the two light bundles travel apart at a predetermined angle $m_z \times \alpha_z / N_z$ in the image scanning direction and at a predetermined angle $m_\rho \times \alpha_\rho / N_\rho$ in the line scanning direction; and arranging the deflecting device is arranged with respect to the two light bundles for synchronous raster scanning of the two light bundles over those image points for which the light bundles are respectively intensity-modulated.

17. A method for displaying a video image in which at least one intensity-modulated light bundle is emitted from a source and is deflected by means of a deflecting device for angle-proportional scanning of $N_p$ image points in lines over an angle $\alpha_\rho$ and for angle-proportional scanning of $N_z$ lines of the picture over an angle $\alpha_z$, comprising the steps of:

providing for the emitting of two light bundles are emitted from the source, the first of which light bundles being modulated with the video information for the illumination of a first image point controlled by raster scanning and the second light bundle being modulated with the video information of a second image point;

offsetting the video information of the second image point relative to that of the first image point by $m_z$ lines and $m_\rho$ image points, with whole numbers $m_z \neq N_z$ and $m_\rho \leq N_\rho$, and $m_z$ and/or $m_\rho \neq 0$; and combining the two light bundles are combined by an optical system at a common real or virtual point situated in front of or inside the deflecting device in the direction of light propagation, proceeding from which real or virtual point the two light bundles travel apart at a predetermined angle $m_z \times \alpha_z / N_z$ in the image scanning direction and at a predetermined angle $m_\rho \times \alpha_\rho / N_\rho$ in the line scanning direction.

* * * * *